(12) United States Patent
Yin et al.

(10) Patent No.: US 10,468,160 B2
(45) Date of Patent: Nov. 5, 2019

(54) ACOUSTO-OPTIC AUDIO SIGNAL CABLE

(71) Applicant: Zhengkai Yin, Shenzhen (CN)

(72) Inventors: Zhengkai Yin, Shenzhen (CN); Xining Wang, Shenzhen (CN)

(73) Assignee: Zhengkai Yin, Shenzhen (CN)

( * ) Notice: Subject to any disclaimer, the term of this patent is extended or adjusted under 35 U.S.C. 154(b) by 91 days.

(21) Appl. No.: 15/844,498

(22) Filed: Dec. 15, 2017

(65) Prior Publication Data

US 2018/0108456 A1  Apr. 19, 2018

Related U.S. Application Data

(63) Continuation of application No. PCT/CN2016/097410, filed on Aug. 30, 2016.

(30) Foreign Application Priority Data

Jan. 21, 2016  (CN) .......................... 2016 1 0040380

(51) Int. Cl.
  *F21V 33/00*  (2006.01)
  *H01B 11/12*  (2006.01)
  (Continued)

(52) U.S. Cl.
  CPC .............. *H01B 11/125* (2013.01); *F21S 4/10* (2016.01); *F21S 4/22* (2016.01); *F21S 4/26* (2016.01); *F21V 19/02* (2013.01); *F21V 23/001* (2013.01); *F21V 23/005* (2013.01); *F21V 23/06* (2013.01); *F21V 33/0056* (2013.01);
  (Continued)

(58) Field of Classification Search
  CPC .. F21V 33/00; F21V 33/0004; F21V 33/0052; F21V 33/0056; F21V 23/00; F21V 23/001; F21V 23/06; F21S 4/00; F21S 4/22; F21S 4/26
  See application file for complete search history.

(56) References Cited

U.S. PATENT DOCUMENTS 5,917,288 A * 6/1999 Feldman .................. G08B 1/08
  315/169.3
7,147,347 B1 * 12/2006 Khachakian ........ F21V 33/0056
  362/227

(Continued)

*Primary Examiner* — Andrew W Bee
(74) *Attorney, Agent, or Firm* — Wayne & Ken, LLC; Tony Hom

(57) ABSTRACT

The invention discloses an acousto-optic audio signal cable which includes an audio wire cluster, at least one LED marquee light wire or at least one illuminating line parallel or spiral twining around outside or external wall of the audio wire cluster and an acousto-optic controller. The audio wire cluster and the LED marquee light wires form a cluster which is coated by a transparent insulating layer. A main circuit board of the acousto-optic controller includes a sampling amplifier circuit component, an analog-digital conversion circuit component, a microprocessor and an output driver sequentially connected. The audio wire cluster is connected to the input end of the sampling amplifier circuit component. The LED marquee light wires are connected to the output driver. The acousto-optic audio signal cable is simple in structure, convenient to operate, dynamic, fashionable and capable of synchronously flickering light during tone and rhythm changes of instrumental performances and speeches.

14 Claims, 18 Drawing Sheets

(51) Int. Cl.

| | |
|---|---|
| *F21S 4/10* | (2016.01) |
| *F21V 19/02* | (2006.01) |
| *F21V 23/00* | (2015.01) |
| *F21V 23/06* | (2006.01) |
| *H05B 37/02* | (2006.01) |
| *H05B 33/08* | (2006.01) |
| *F21S 4/22* | (2016.01) |
| *F21S 4/26* | (2016.01) |
| *G02F 1/11* | (2006.01) |
| *F21Y 115/10* | (2016.01) |
| *F21S 9/02* | (2006.01) |
| *F21L 4/00* | (2006.01) |
| *F21W 131/30* | (2006.01) |

(52) U.S. Cl.
CPC ......... *G02F 1/113* (2013.01); *H05B 33/0806* (2013.01); *H05B 33/0842* (2013.01); *H05B 37/0236* (2013.01); *F21L 4/00* (2013.01); *F21S 9/02* (2013.01); *F21W 2131/30* (2013.01); *F21Y 2115/10* (2016.08); *H01B 11/12* (2013.01)

(56) References Cited

U.S. PATENT DOCUMENTS

| | | | | |
|---|---|---|---|---|
| 7,671,279 | B2* | 3/2010 | Yin | H01B 7/366 174/113 R |
| 2004/0022053 | A1* | 2/2004 | Sharon | H05B 33/00 362/84 |
| 2006/0050508 | A1* | 3/2006 | Lee | F21V 33/0056 362/227 |
| 2007/0081690 | A1* | 4/2007 | Stagni | H04R 1/028 381/384 |
| 2011/0103607 | A1* | 5/2011 | Bychkov | H04R 1/1033 381/74 |
| 2015/0092955 | A1* | 4/2015 | Jiang | H04R 1/10 381/74 |
| 2015/0332810 | A1* | 11/2015 | Crossland | H01B 11/22 362/582 |
| 2015/0334485 | A1* | 11/2015 | Tyagi | H01B 11/22 381/74 |
| 2015/0373449 | A1* | 12/2015 | Jackson | H04R 1/1033 381/74 |

* cited by examiner

ACOUSTO-OPTIC AUDIO SIGNAL CABLE

TECHNICAL FIELD

The present disclosure relates to an audio signal cable and in particular to a guitar cable, a microphone cable, a speaker cable or an earphone cable, which are illustrated in time to music.

BACKGROUND

The existing electric guitar cables, microphone cables, speaker cables and earphone cables are audio signal cables wrapped in black sheath, gray sheath or white sheath. Appearance of the audio signal cables is austere and monotonous, and conflict with the lively, boisterous and fashionable atmosphere at social events. Thus, it is necessary to make improvements to the audio signal cables.

SUMMARY

In view of disadvantages of the related art, an object of the present disclosure is to provide an electric guitar cable, a microphone cable, a speaker cable and an earphone cable being visually active with simple construction and operational convenience and having special function which is capable of synchronous producing regular flashes of light or a chasing in sequence as running water effect according to sound and rhythm of playing, speaking or singing.

In order to solve the technical problems, the technical solution adopted in the present disclosure is to provide an acousto-optic audio signal cable which includes: an audio wire cluster, an acousto-optic controller, at least one light emitting diode (LED) marquee light wire or at least one LED light emitting string. The at least one LED marquee light wire or the at least one LED light emitting string is parallel arranged at an outside of the at least one audio wire cluster or the at least one LED marquee light wire or the at least one LED light emitting string is wound in a spiral on an external wall of the audio wire cluster, thereby forming one cluster. A transparent or light-transmitting insulating layer wraps the one cluster.

One technical solution is to provide an acousto-optic audio signal cable which includes: an audio wire cluster, an acousto-optic controller, at least one light emitting diode (LED) marquee light wire or at least one LED light emitting string. The at least one LED marquee light wire or the at least one LED light emitting string is parallel arranged at an outside of the at least one audio wire cluster or the at least one LED marquee light wire or the at least one LED light emitting string is wound in a spiral on an external wall of the audio wire cluster, thereby forming one cluster. A transparent or light-transmitting insulating layer wraps the one cluster. The acousto-optic controller includes a main circuit board, and the main circuit board includes a sampling amplifier circuit component, an analog-digital conversion circuit component, a microprocessor and an output driver that are sequentially coupled to each other. The audio wire cluster is coupled to an input terminal and an output terminal of the sampling amplifier circuit component. The at least one LED marquee light wire is coupled to the output driver.

In order to solve the technical problems, another technical solution adopted in the present disclosure is to provide an acousto-optic audio signal cable which includes: an audio wire cluster, an acousto-optic controller, at least one light emitting diode (LED) marquee light wire or at least one LED light emitting string. The at least one LED marquee light wire or the at least one LED light emitting string is parallel arranged at an outside of the at least one audio wire cluster or the at least one LED marquee light wire or the at least one LED light emitting string is wound in a spiral on an external wall of the audio wire cluster, thereby forming one cluster. A transparent or light-transmitting insulating layer wraps the one cluster. The acousto-optic controller includes a main circuit board, and the main circuit board includes a bluetooth wireless transceiver circuit component, a digital-analog and analog-digital bidirectional conversion circuit component, a microprocessor and an output driver. The at least one LED light emitting string is coupled to the output driver.

In order to solve the technical problems, a third technical solution adopted in the present disclosure is to provide an acousto-optic audio signal cable which includes an audio wire cluster, at least one electroluminescent (EL) cable and an acousto-optic controller. The audio wire cluster is disposed in parallel with the at least one EL cable or is disposed at a central axis of the EL cable, thereby forming one cluster. The one cluster is wrapped in a transparent or light-transmitting insulation layer. The acousto-optic controller includes a main circuit board, and the main circuit board includes a sampling amplifier circuit component, an analog-digital conversion circuit component, a microprocessor and an output driver that are sequentially coupled to each other. The audio wire cluster is coupled to an input terminal and an output terminal of the sampling amplifier circuit component. The at least one EL cable is coupled to the output driver.

Compared to the related art, the acousto-optic audio signal cable of the present disclosure is simple in structure, easy in operation, dynamic and fashionable, and is capable of synchronous producing regular flashes of light according to sound and rhythm of playing or speaking.

The audio wire is composed of a signal conductor and a ground conductor. For a two-channel or multi-channel audio wire, the audio wire is composed of at least one left channel signal conductor, at least one set of right channel signal conductors, at least one set of microphone signal conductors, and at least one set of ground conductors. Each set of conductor is composed of a plurality of metal-insulated conductors with low-impedance and high-conductivity. In order to increase an anti-interference ability of the signal conductors, an aluminum foil shielding layer or a metal woven mesh shield layer can wrap a round or a flat external wall of the audio wire.

A set of LED light emitting strings is composed of a positive copper conductor, a negative copper conductor and LED lights connected in parallel between the positive copper conductor and the negative copper conductor. An LED light in the LED light emitting string includes a number of LED light beads connected in parallel or in series. Each LED light is respectively fillet-weld between the adjacent copper conductors at a pre-set interval along a pre-set direction.

A positive copper conductor and a negative copper conductor are coupled to the positive and negative output terminals of the output driver. The other ends of the positive and negative copper conductors extend along the audio wire cluster. A positive copper conductor and a negative copper conductor forms a conduction loop with a set of LED light emitting strings that are connected in parallel. In the conduction loop, several ED lights are respectively fillet-weld between the adjacent copper conductors at a pre-set interval along a pre-set direction.

A positive copper conductor and a negative copper conductor are coupled to the positive and negative output terminals of the output driver. The other ends of the positive and negative copper conductors extend along the audio wire cluster. A positive copper conductor and a negative copper conductor forms a conduction loop with a set of LED light emitting strings that are connected in series. In the conduction loop, the positive copper conductor is divided into several sections or several groups. In each section or group, several surface-mounted LED lights are weld in series to two ends of the several copper conductor sections; a negative pole of the last light of each group is connected to the negative copper conductor.

Single LED light emitting string can only have two kinds of luminance function, that is, constant bright and flickering. Three sets of LED light emitting strings are combined together in parallel to form a LED marquee light wire. Marquee that can produce light in flash in a manner of a chasing in sequence as running water can be achieved through a multi-channel current output controller. In addition to the function of the marquee, the marquee light wire also provides constant bright and flickering functions.

The LED marquee light wire is composed of at least three sets of LED light emitting strings. The LED light emitting string is composed of surface-mounted LED lights and positive and negative copper conductors, or is composed of surface-mounted LED lights and an FPC board. The acousto-optic controller outputs a current of the rated voltage required by LED light emitting string and LED marquee light wire, so that the LED light emitting string and LED marquee light wire are luminous. Flickering luminance of the LED light emitting string according to the rhythm of the music can be controlled by a IC controlling program of the acousto-optic controller to successively turn on and turn off the three sets of LED light strings or by changing the inputting voltage of the current. The water-flowing like luminous pattern or changing in brightness and rhythm can also be controlled in LED marquee light wire using the same ways.

In particular, the negative copper conductor and the positive copper conductor are preferably polyurethane-coated copper conductors with direct solderability.

As a preferred technical solution, each EL cable includes at least three EL cables and at least one common auxiliary electrode bare conductor. The at least three EL cables and at least one common auxiliary electrode bare conductor respectively correspond to output terminals of the output driver. A conductive layer of the at least three EL cables and the common auxiliary electrode bare conductor contact with each other and are wound around an external wall of the audio wire cluster.

Specifically, an insulation layer, a metal woven mesh shield layer or an aluminum foil shielding layer is provided between the LED marquee light wire, the LED light emitting string or the EL cable and the audio wire cluster.

Further, the acousto-optic controller further includes a housing and a power supply/charging external socket embedded in the housing. The main circuit board is provided in the housing. The main circuit board further includes a power circuit component. An input terminal of the power circuit component is connected to a power supply/charging external socket; an output terminal of the power circuit component is respectively connected to a sampling amplifier circuit component, an analog-digital conversion circuit component, a microprocessor and an output driver, or respectively connected to a bluetooth wireless transceiver circuit component, a digital-analog and analog-digital bidirectional conversion circuit component, a microprocessor and an output driver.

The acousto-optic audio signal cable is composed of at least one set of LED marquee light wire, or at least one set of LED light emitting string or at least one set of EL cable and an acousto-optic controller connected to the cable. The cable is provided in parallel with and at a side of an electric guitar cable, a microphone cable, a speaker cable or an earphone cable, or is wound in a spiral around the external wall of the electric guitar cable, the microphone cable, the speaker cable or the earphone cable. A transparent or light transmitting plastic layer wraps an outside of the combination of these cables.

Further, the LED marquee light wire or LED light emitting string includes surface-mounted LED lights and an FPC board (also known as flexible PCB circuit board), the LED marquee light wire is coupled to the output driver.

The acousto-optic audio signal cable is composed of surface-mounted LED lights, an audio wire cluster and an FPC board. The audio signal cable and positive and negative circuits of the LED light emitting string are provided on the FPC board in the form of printed circuits, without further laying audio signal wire cluster. A plurality of FPC terminal plug-connected conductive strips is provided in parallel at terminal ends of the FPC strip board. The plug-connected conductive strips are connected to audio signal wire cluster and the positive and negative poles of the LED light emitting string. The plug-connected conductive strips can be provided as a terminal of the acousto-optic audio signal cable and be directly plug into the FPC terminal socket of the main circuit board or an earphone, thereby enabling the main circuit board to receive audio signal from the earphone, and enabling the main circuit board to be coupled to the LED light emitting string so as to drive the LED light emitting string to be flicker-luminous according to the music rhythm and tone.

Both ends of the acousto-optic audio signal cable are provided with connector lugs. A $\phi$ 6.35 mm or $\phi$ 6.5 mm audio plug is provided for an electric guitar, a microphone and an audio equipment and $\phi$ 3.5 mm audio plug is provided for a mobile phone earphone and a small speaker device. As the first terminal, one end is directly connected to the audio equipment, such as an electric guitar, a microphone, a mobile phone, or a music amplifier; the other end as the second terminal is directly connected to and plug in the amplifier equipment, such as speakers, earphones etc. One set of the audio wires in parallel in the acousto-optic audio signal cable is selected and connected to the sampling amplifier circuit of the acousto-optic controller. The EL cable or the LED marquee light wire or the LED light emitting string in the acousto-optic audio signal cable is connected to an AC output circuit or a DC output circuit of the acousto-optic driver.

Except that the plug for an earphone cable is provided with $\phi$ 3.5 mm audio plug or with the terminal plug-connected conductive strip mentioned above in the acousto-optic audio signal cable to connect a mobile phone, a plug at one end of acousto-optic audio signal cable is a lightning plug, a type-C plug or a micro USB plug.

The plug can be connected to the mobile phone output socket, which enables a phone power supply directly connected to the main circuit board in the acousto-optic audio signal cable. A battery packs battery circuit and a storage battery are thus eliminated in the power circuit components.

In the preferred embodiments mentioned above, a cross-section of the luminous electric guitar cable, the microphone cable, the speaker cable, the earphone cable may be round or flat, or may be oval.

The sampling amplifier circuit is connected to multiple audio wires in the acousto-optic controller, for sampling a music or sound analogue signal. The output driver of the acousto-optic controller is connected to the LED marquee light wire or LED light emitting string or EL light emitting cable.

Except that one end of the luminous electric guitar cable, the EL cable or the LED marquee light wire in the audio wire is connected to the AC output circuit or the DC output circuit in the output controller, the other end thereof is insulated and is not connected to any contact.

The acousto-optic controller is provided in a housing which provides a charging receptacle hole, a switch, an external power cord and a plug. The acousto-optic controller and its housing can be provided in the acousto-optic audio signal cable or at one end of the acousto-optic audio signal cable. When the acousto-optic controller and its housing are provided in the acousto-optic audio signal cable, the other end of the acousto-optic audio cable is connected to the first terminal and the second terminal; in the other case, one end of the acousto-optic controller and the housing is connected to the acousto-optic audio signal cable, and the other end is directly connected to the second terminal or indirectly connected to the second terminal through an extending line of the acousto-optic audio signal cable.

The power circuit component in the acousto-optic controller includes a battery packs battery circuit and a storage battery, the power circuit component supplies power for the sampling amplifier circuit component, the analog-digital conversion circuit component, the microprocessor as well as the output driver; or the power circuit component supplies power for the bluetooth wireless transceiver circuit component, the digital-analog and the analog-digital bidirectional conversion circuit component, the microprocessor, as well as the output driver.

Another preferred way of supplying power to the acousto-optic controller, is that an AD power supply is built into the housing and a power cord with a power plug is provided outside the housing.

The sampling amplifier circuit component in the acousto-optic controller samples an audio signal, transmits the signal to the analog-to-digital conversion circuit component, and then transmits the signal to the microprocessor for analysis and calculation process. The audio analogue signal with a change in volume and in rhythm is transferred to digital signal with a change in current and voltage. By controlling the change in current and voltage of each output end in the output driver, changing of the brightness, luminous intensity and rhythm speed of successive luminance of the EL cable, the LED marquee light wire or the LED light emitting string can be further controlled.

The bluetooth wireless transceiver circuit component in the acousto-optic controller is provided to receive and process the wireless digital and analog signals, and is provided to transmit the digital signal of the mobile phone to the microprocessor on the main circuit board and further to synchronously transmit the signal to the output driver to control LED light strings, so that luminous rhythm and luminous brightness change with the music rhythm and the voice level. At the same time, the digital signal is converted into analog signals to drive earphones to make sounds. The bluetooth wireless transceiver circuit component can also transmit the analog signal of a microphone voice into a digital signal, and the signal can be sent wirelessly to the phone.

The present disclosure will be further described below with drawings and embodiments.

Figure 1:
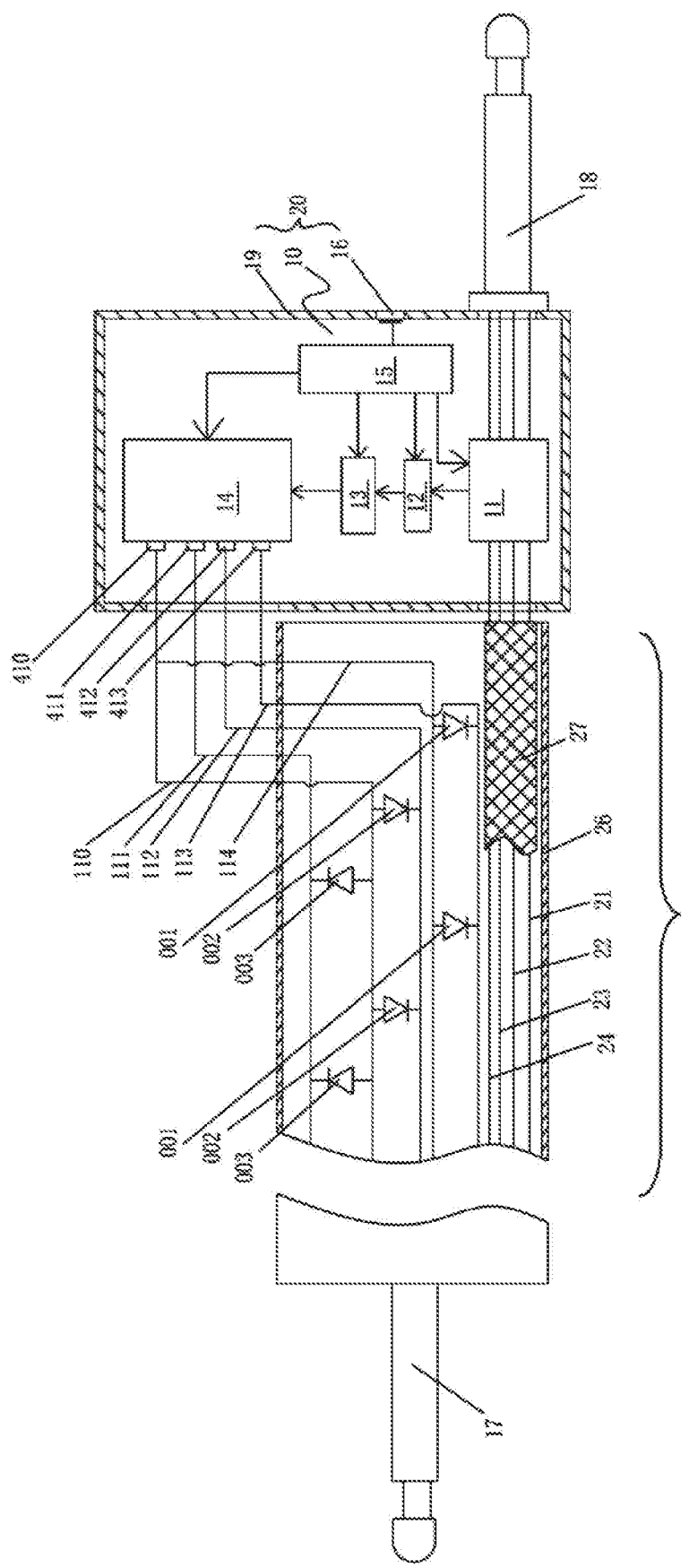
FIG. 1 shows a structural schematic diagram of embodiment 1.

In the drawings:
- 10: main circuit board;
- 11: sampling amplifier circuit component;
- 12: analog-digital conversion circuit component;
- 13: microprocessor;
- 14: DC output driver;
- 15: power circuit component;
- 16: power supply/charging external socket;
- 17: first terminal;
- 18: second terminal;
- 19: housing;
- 20: acousto-optic controller;
- 21: signal conductor;
- 22: signal conductor;
- 23: signal conductor;
- 24: ground conductor;
- 25: insulating layer;
- 26: transparent insulating layer;
- 27: metal woven mesh shield layer;
- 28: FPC board;
- 29: bluetooth wireless transceiver circuit component;
- 30: digital-analog and analog-digital bidirectional conversion circuit component;
- 31: FPC terminal socket;
- 32: microphone;
- 33: earphone acousto-optic audio signal cable;
- 34: earphone lightning plug;
- 35: type-C plug;
- 36: first structure of acousto-optic audio signal cable;
- 37: second structure of acousto-optic audio signal cable;
- 38: third structure of acousto-optic audio signal cable;
- 39: fourth structure of acousto-optic audio signal cable structure;

40: fifth structure of acousto-optic audio signal cable;
41: sixth structure of acousto-optic audio signal cable;
42: seventh structure of acousto-optic audio signal cable;
43: eighth structure of acousto-optic audio signal cable;
44: ninth structure of acousto-optic audio signal cable;
45: tenth structure of acousto-optic audio signal cable;
46: mobile phone;
47: φ3.5 mm earphone audio plug;
010: earphone;
015: FPC terminal plug-connected conductive strip;
016: FPC terminal plug-connected conductive strip;
017: FPC terminal plug-connected conductive strip;
018: FPC terminal plug-connected conductive strip;
021: printed signal conductor circuit;
024: printed signal ground circuit;
029: LED light emitting string;
410: DC positive-electrode output terminal;
411: DC negative-electrode input terminal;
412: DC negative-electrode input terminal;
413: DC negative-electrode input terminal;
110: positive copper conductor;
111: negative copper conductor;
112: negative copper conductor;
113: negative copper conductor;
114: positive copper conductor;
001: surface-mounted LED light;
002: surface-mounted LED light;
003: surface-mounted LED light;
42: one-way DC output driver;
43: three-way AC output driver;
30: common AC output terminal;
31: AC output terminal;
32: AC output terminal;
33: AC output terminal;
50: common auxiliary electrode bare conductor;
51: EL cable;
52: EL cable;
53: EL cable;
54: luminous line transparent wrapping layer;
55: luminance line guide electrode conductor;
56: luminance line central electrode conductor.

DETAILED DESCRIPTION

Embodiment 1

Figure 4:
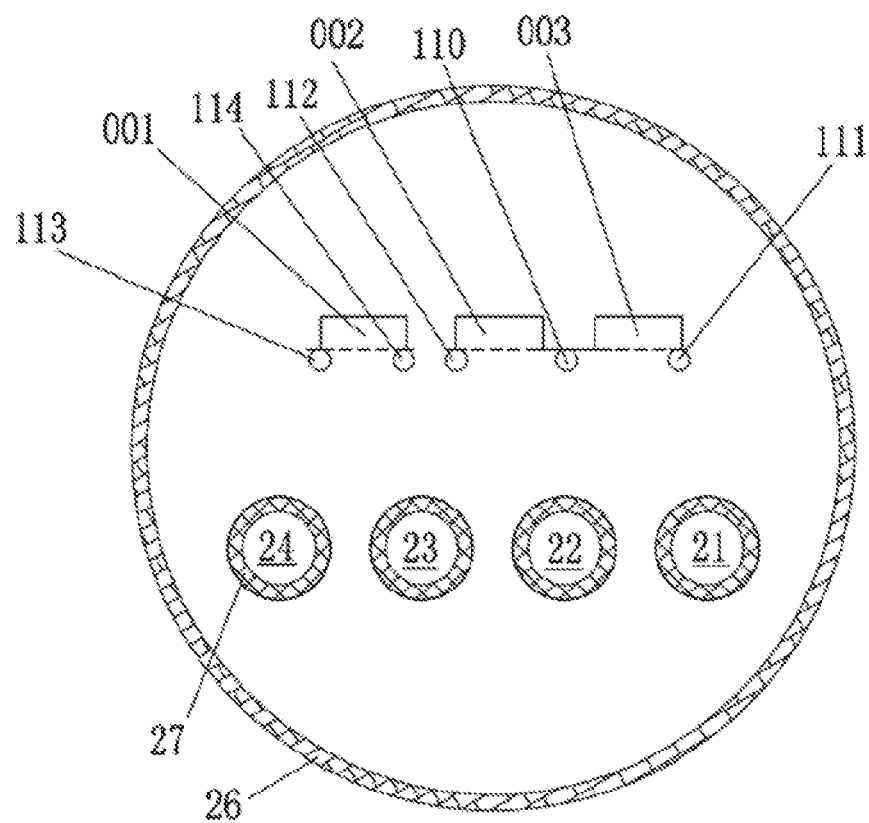
FIG. 4 is a schematic diagram showing a cross-section of an audio wire cluster in embodiment 1.

Referring to FIG. 1 and FIG. 4, an acousto-optic audio signal cable 36 according to a first embodiment includes an acousto-optic controller 20, an audio wire cluster, a set of light emitting diode (LED) marquee light wires 50, a first terminal 17, a second terminal 18, and a transparent insulating layer 26. The audio wire cluster includes a plurality of audio cables that are mutually twisted or disposed in parallel. An input end of the acousto-optic controller 20 is coupled to an end of the audio wire cluster and an end of the LED marquee light wire, respectively. An output end of the acousto-optic controller 20 is coupled to the second terminal 18. The other end of the audio wire cluster is coupled to the first terminal 17. The transparent insulating layer 26 wraps the audio wire cluster and the LED marquee light wire.

Specifically, the acousto-optic controller 20 includes a housing 19, a main circuit board 10 disposed in the housing 19, and a power supply/charging external socket 16 embedded in the housing 19. The main circuit board 10 includes a sampling amplifier circuit component 11, an analog-digital conversion circuit component 12, a microprocessor 13, a direct current (DC) output driver 14, and a power circuit component 15. An output terminal of the sampling amplifier circuit component 11 is coupled to an input terminal of the analog-digital conversion circuit component 12. An output terminal of the analog-digital conversion circuit component 12 is coupled to an input terminal of the microprocessor 13. An output end of the microprocessor 13 is coupled to an input terminal of the DC output driver 14. The power circuit component 15 is electrically coupled to the sampling amplifier circuit component 11, the analog-digital conversion circuit component 12, the microprocessor 13 and the DC output driver 14, respectively, and provides stable current for the sampling amplifier circuit component 11, the analog-digital conversion circuit component 12, the microprocessor 13, and the DC output driver 14. The power supply/charging external socket 16 is coupled between the power circuit component 15 and an external power source, and provides power for the power circuit component 15 to charge the power circuit component 15. The DC output driver 14 includes a DC positive-electrode output terminal 410 and three DC negative-electrode input terminals 411, 412 and 413.

The audio wire cluster includes a plurality of audio wires that are mutually twisted or disposed in parallel. In the present embodiment, optionally, the audio wire cluster includes three sets of signal conductors 21, 22, 23 and a set of ground conductors 24. Optionally, each set of signal conductors is composed of a plurality of metal insulated conductors with low impedance as well as high conductivity. One end of each set of audio cables is coupled to the first terminal 17 and the other end thereof is coupled to the input terminal of the sampling amplifier circuit component 11. The sampling amplifier circuit component 11 receives an electrical signal from the audio cable. In addition, the output terminal of the sampling amplifier circuit component 11 is coupled to the second terminal 18 through the second set of the audio cables. In the present embodiment, optionally, the second set of audio cables includes three sets of signal conductors 21, 22, 23 and a set of ground conductors 24. Further, the second set of audio cables are coupled to the audio cables at the input terminal of the sampling amplifier circuit component 11 inside the sampling amplifier circuit component 11 in a one-to-one manner. Voice signal is transmitted by the second set of audio cables to an amplifier equipment through the second terminal 18.

The LED marquee light wire includes a plurality of surface-mounted LED lights 001, 002, 003, two or three positive copper conductors 110, 114 and three negative copper conductors 111, 112, 113. One end of each of the two or three positive copper conductors 110 and 114 is coupled to the DC positive output terminal 410 of the DC output driver 14. The other end of each of the two or three positive copper conductors 110 and 114 extends along the audio wire cluster. One end of each of the three negative copper conductors 111, 112, and 113 is coupled to each of three DC negative input terminals 411, 412, 413 of the DC output driver 14 in a one-to-one manner. The other end of each of the three negative copper conductors 111, 112, and 113 extends along the audio wire cluster. One of the positive copper conductors 110 and 114 and one of the negative copper conductor 111, 112 and 113 form a conduction loop with a light string including a set of surface-mounted LED lights 001, 002 and 003. Alternatively, one of the positive copper conductors 110 and 114 and two of the negative copper conductors 111, 112, and 113 arranged at opposite sides of the one of the positive copper conductors 110 and 114 may form conduction loops with a light string including two sets of surface-mounted lights 001, 002 and 003. The surface-mounted LED lights 001, 002, 003 in each conduction loop are composed of at least three surface-mounted LED light beads. Each of the surface-mounted LED lights 001, 002 and 003 is respectively fillet-weld between one of the positive copper conductors 110 and 114 and one of the negative copper conductors 111, 112 and 113 adjacent the one of the positive copper conductors 110 and 114 at a preset interval along a preset direction. Each of the surface-mounted LED light beads is electrically coupled to the DC output driver 14 through one of the positive copper conductors 110 and 114 and one of the negative copper conductors 111, 112, and 113, and then emits light sequentially.

Each of the audio wires is wrapped with a metal woven mesh shield layer 27. The transparent insulating layer 26 wraps an integrated wire cluster of the audio wire cluster and the LED marquee light wire.

Further, the metal woven mesh shield layer 27 may be replaced with an aluminum foil shield layer. Both the aluminum foil shield layer and the metal woven mesh shield layer 27 are able to enhance an anti-interference ability of the audio cable.

When used, the first terminal 17 is coupled to an audio equipment and the second terminal 18 is coupled to an amplifier equipment. When the audio equipment makes sounds, the sound transmitted by the audio wire is output through the amplifier equipment. Further, the sampling amplifier circuit component 11 samples an acoustic electrical signal from the audio wires, and transmits the acoustic electrical signal to the analogue-digital conversion circuit component 12. The acoustic electrical signal is converted into a digital signal by the analog-digital conversion circuit component 12. The digital signal is transmitted to the microprocessor 13, then is converted into a pulse signal and then is output to the DC output driver 14. The DC output driver 14 controls the LED marquee lights to produce regular flash of light or produce a flow of light in sequence according to the received pulse signal command.

In the microprocessor 13, a specific conversion correspondence between the digital signals and pulse signals has been set in advance. Thus, a flash effect or a chasing in sequence as running water effect corresponding to each sound can be produced. In this way, the light effect produced by the acousto-optic audio signal cable corresponding to each sound in the audio can be characterized.

Figure 6:
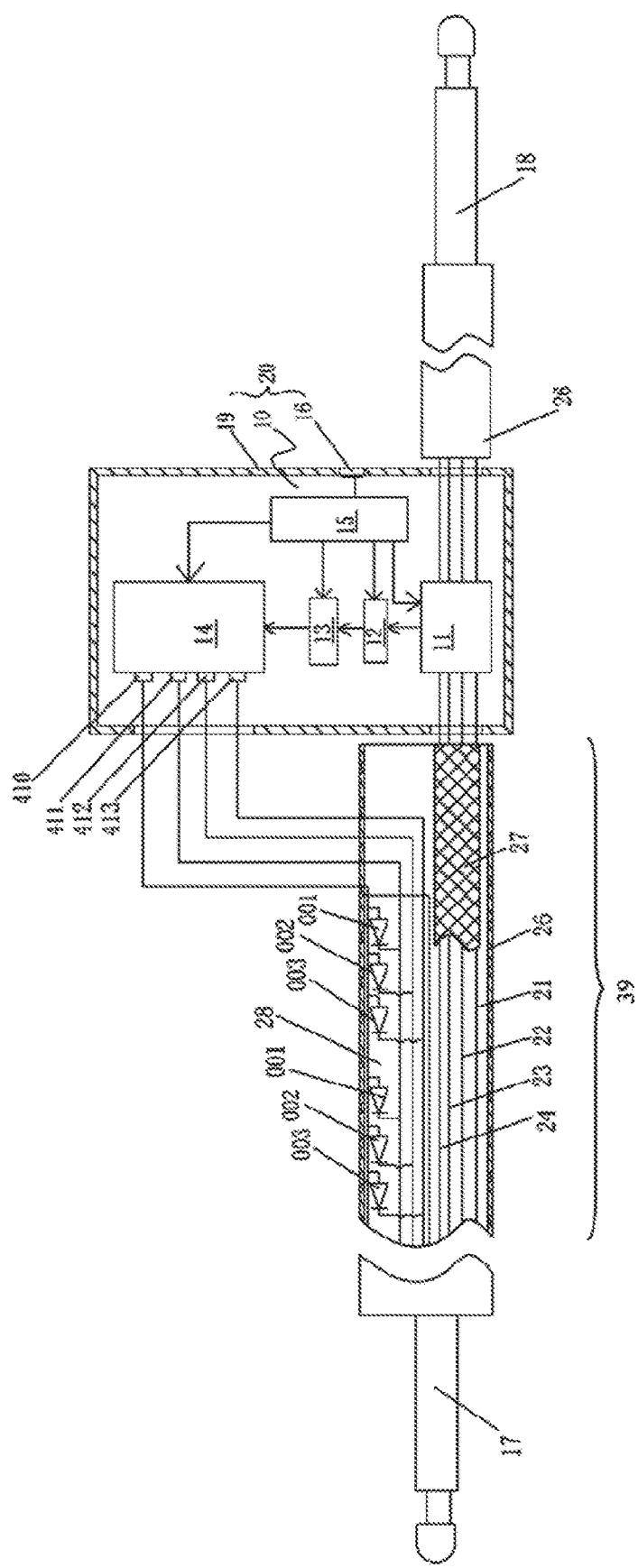
FIG. 6 shows a structural schematic diagram of embodiment 5.
Figure 7:
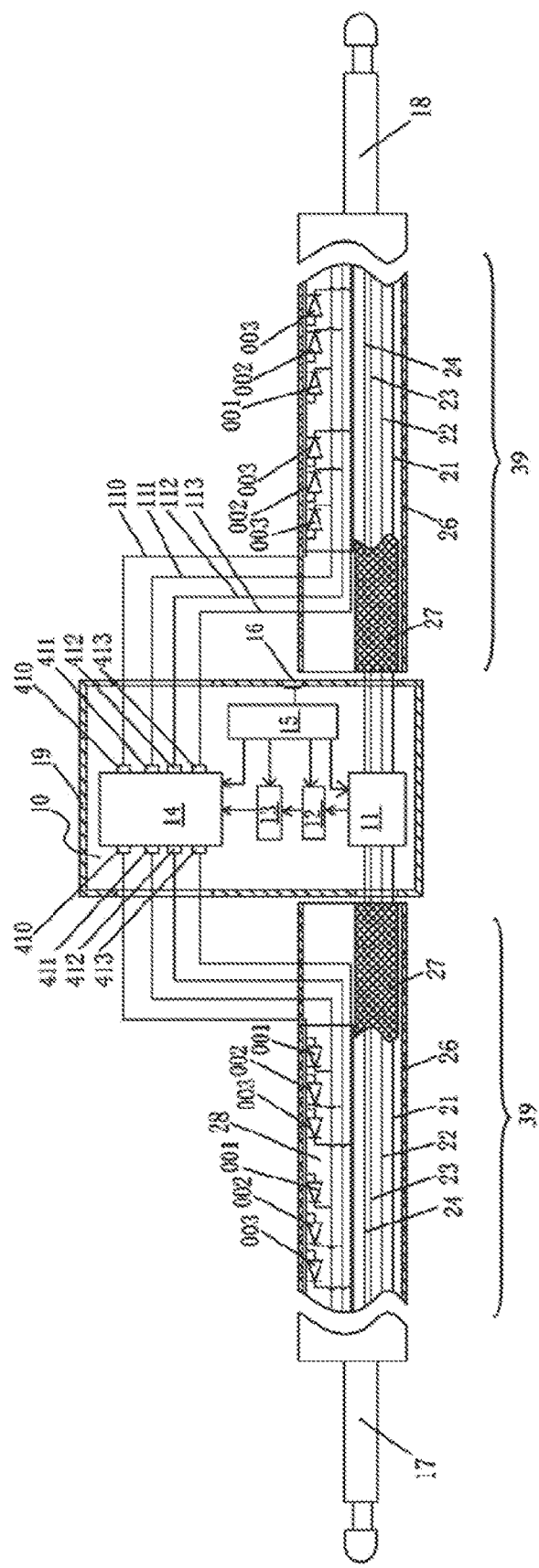
FIG. 7 shows a structural schematic diagram of embodiment 6.

In the present embodiment, the second terminal 18 is directly coupled to the acousto-optic controller 20 and the housing 19. As shown in FIG. 7, the second terminal 18 may be coupled to an end of another segment of the acousto-optic audio cable, or as shown in FIG. 6, the second terminal 18 may be directly coupled to the terminal of the audio signal cable.

Embodiment 2

Figure 2:
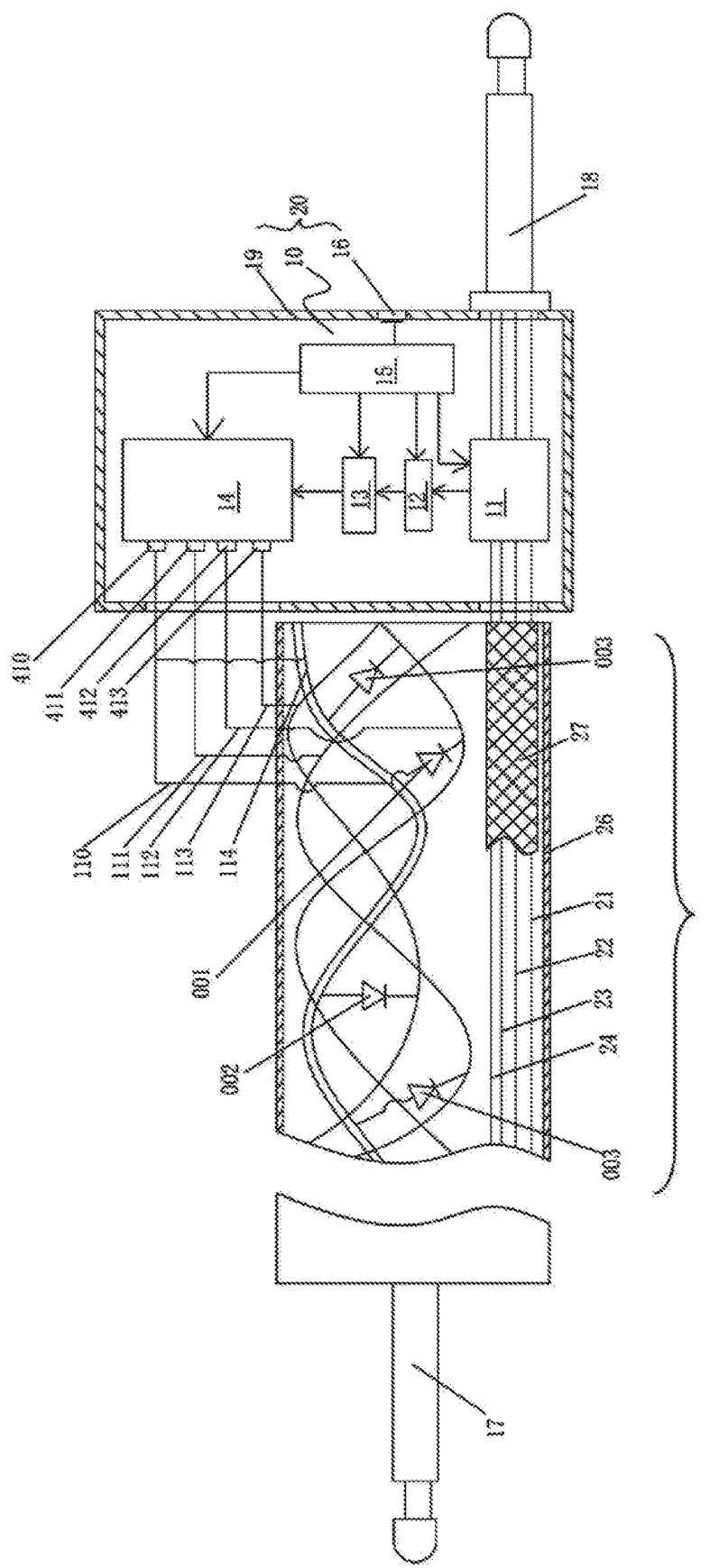
FIG. 2 shows a structural schematic diagram of embodiment 2.
Figure 3:
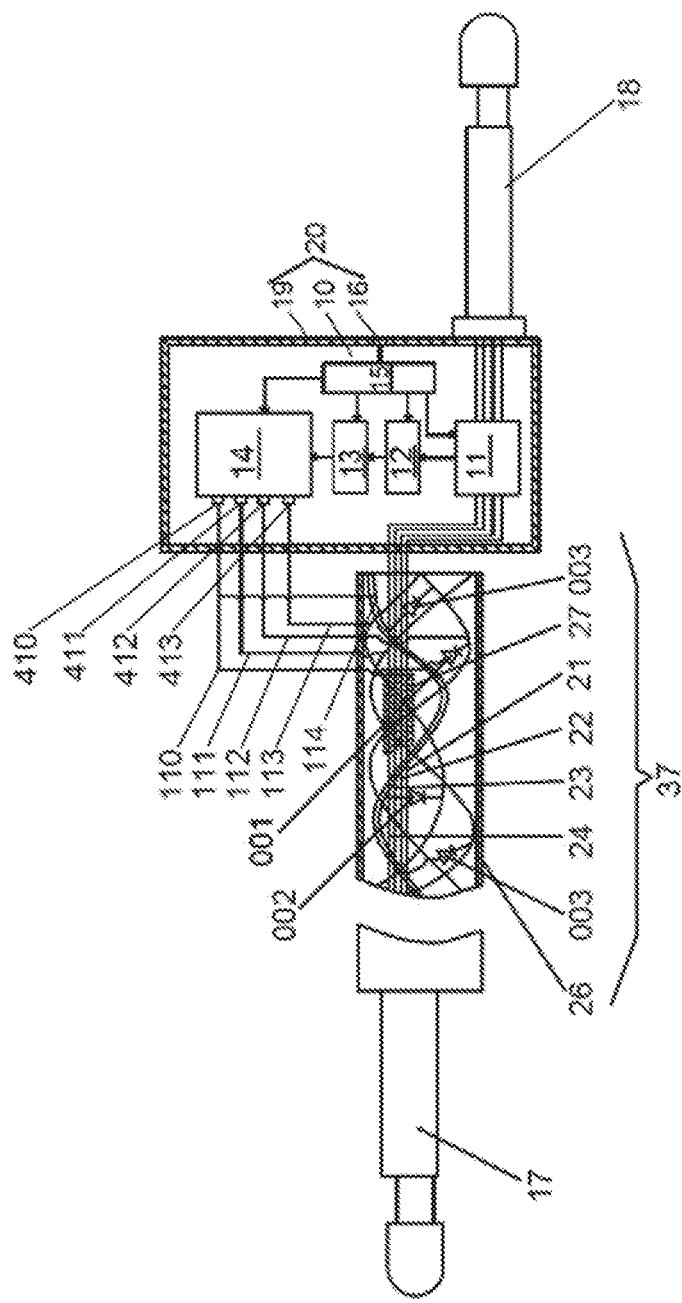
FIG. 3 shows another structural schematic diagram of embodiment 2.

As shown in FIG. 2 and FIG. 3, acousto-optic audio signal cables 37 and 38 are similar to that in the first embodiment. The differences lie in that in the LED marquee light wire in the embodiment 2, five parallel copper wires attached with LED lights can form three pairs of LED emitting wires, the three pairs of LED emitting wires can be would in a spiral at a certain twist pitch at one side of the audio wire cluster, or would in a spiral on an outer wall of the audio wire cluster, thereby forming a LED marquee light acousto-optic audio signal cable. One end of the cable is coupled to the DC output driver 14 and is disposed in the transparent insulating layer 26. The regular flash of light or a flow of light produced by the cable can be presented through the transparent or light-transmitting insulating layer 26. Because the copper wires of the acousto-optic audio signal cable are would in a spiral, the cross-sectional area of the whole acousto-optic audio signal cable can be small, thus the acousto-optic audio signal cable can afford a large enough pull force and can be flexible.

Embodiment 3

Figure 5:
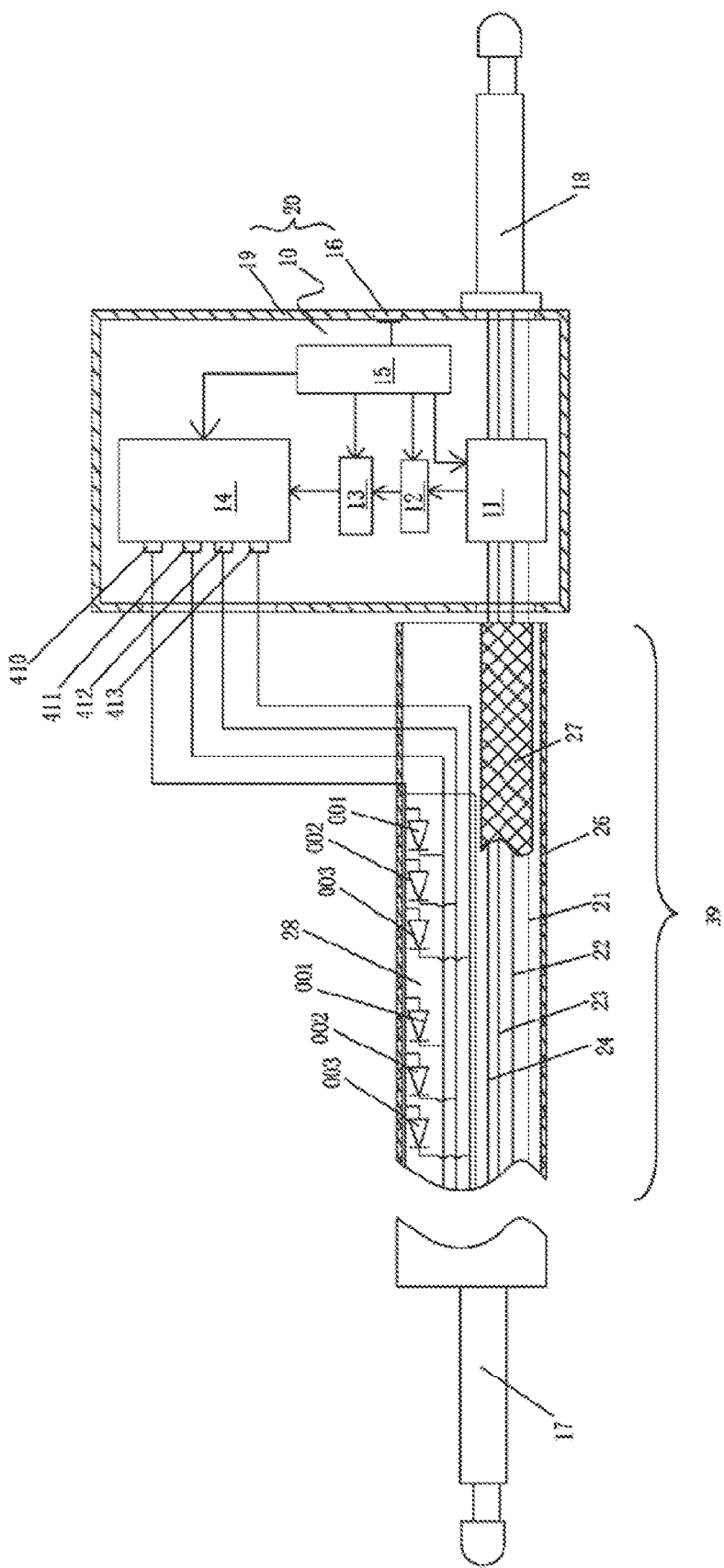
FIG. 5 shows a structural schematic diagram of embodiment 3.

As shown in FIG. 5, an acousto-optic audio signal cable 39 is similar to that in the embodiment 1. The differences lie in that there is only one set of LED marquee light. The LED marquee light includes surface-mounted LED lights 001, 002 and 003 as well as a flexible printed circuit (FPC) board 28. A cross-sectional area of the single set of LED marquee light acousto-optic cable is small, and a cost of the acousto-optic cable is low. However, the whole acousto-optic audio signal cable can produce light effect from 180° directions in a cross-section of the acousto-optic audio signal cable, and may produce a shadow.

Embodiment 4

Figure 8:
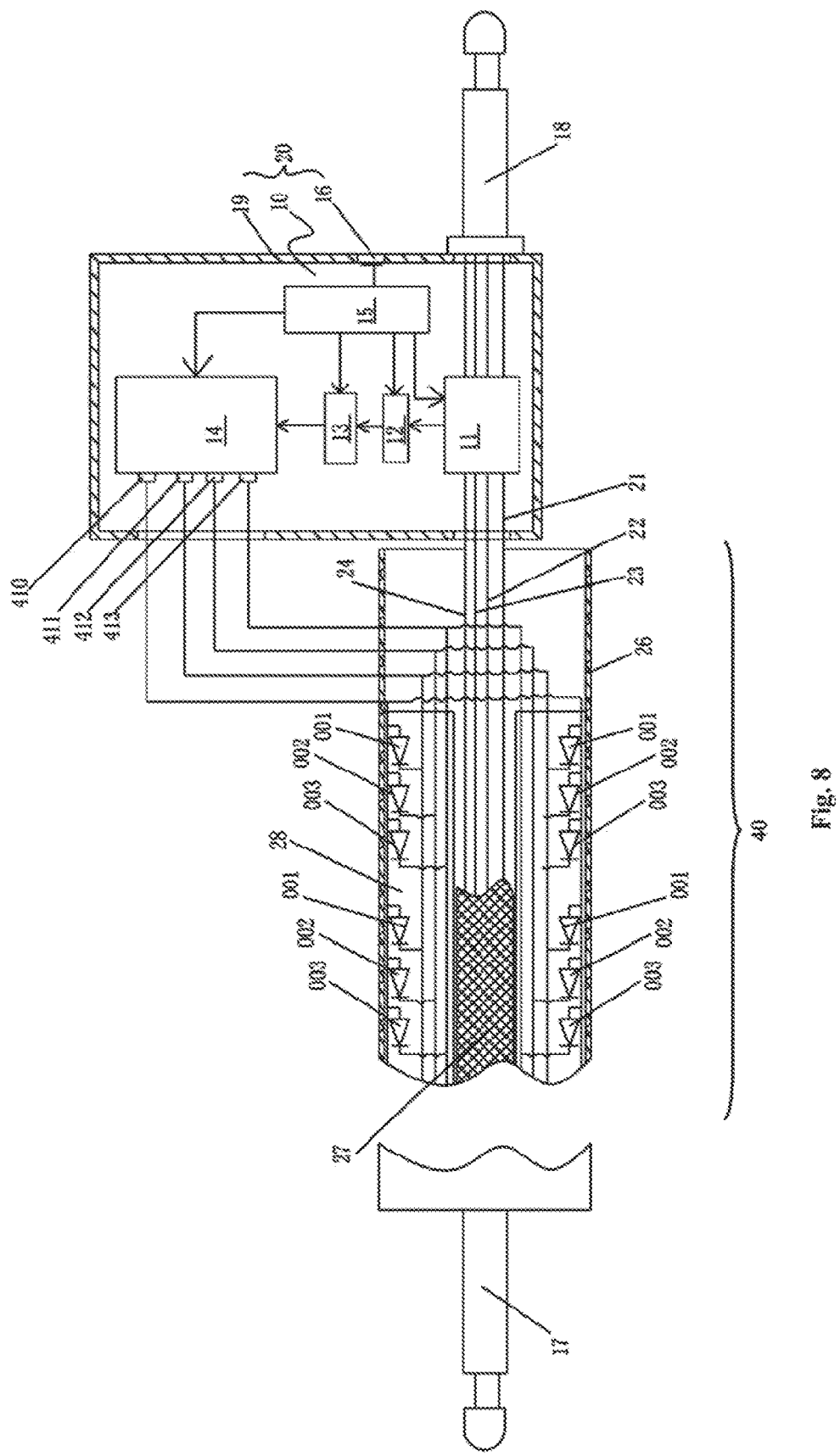
FIG. 8 shows another structural schematic diagram of embodiment 4.

As shown in FIG. 8, an acousto-optic audio signal cable 40 is similar to that in Embodiment 1. The differences lie in that there are two sets of LED marquee light wires in embodiment 4, and each set includes surface-mounted LED lights 001, 002 and 003 as well as a FPC board 28. The two sets of LED marquee light wires are juxtaposed on the audio wire cluster, and are coupled to the DC output driver 14, respectively. The positive copper conductors 110, 114 can be replaced by an ordinary printed positive circuits, and the negative copper conductors 111, 112, and 113 can be replaced by an ordinary printed negative circuits. This structure doubles a light emitting area of the entire acousto-optic audio cable. Thus, the whole acousto-optic audio signal cable can produce light effect from 360° directions in a cross-section of the acousto-optic audio signal cable without any shadow, which is quite bright and beautiful. Further, because the two sets of LED marquee light wires and the audio wire juxtaposed with the two sets of LED marquee light wires are wrapped in the transparent insulating layer 26, thus the marquee and flashing light effect can be presented through the transparent insulating layer 26.

On the basis of the embodiment 3, it will be apparent for those skilled in the art that three or more sets of LED marquee lights wires can be disposed on the audio wire cluster. This modification or replacement falls within the scope of the claims and within the scope of equivalent technical solutions of the present disclosure.

Embodiment 5

As shown in FIG. 6, the embodiment 5 is similar to the embodiment 3. The differences lie in that a second set of audio wires between an acousto-optic controller 20 and a second terminal 18 in the embodiment 5 is sufficiently long. The controller 20 is not in direct contact with the second terminal 18 and an insulating layer 25 wraps an outside of an integrated cluster of the bare second set of the audio wires.

Specifically, in the second set of audio wires, each of the audio wires is wrapped in a metal woven mesh shield layer 27, and each metal woven mesh shield layer 27 is wrapped in one insulating layer 25. A wire cluster of integrated audio wires in the second set is wrapped in the transparent insulating layer 26.

As another optional technical solution, in the second set of audio wires, each of the audio wires is wrapped in one insulating layer 25, and the wire cluster of integrated audio wires in the second set is wrapped in the transparent insulating layer 26.

Further, this improvement mentioned in the embodiment 5 can also be applied to the embodiment 1, the embodiment 2 and the embodiment 3.

Embodiment 6

As shown in FIG. 7, an acousto-optic audio signal cable 39 is similar to that in embodiment 5. The differences lie in:

1) an additional group of terminals are provided for the DC output driver 14 in the embodiment 6, that is, each group of terminals of the DC output driver 14 includes a DC positive output terminal 410 and three DC negative input terminals 411, 412 and 413;

2) in the embodiment 6, there are two sets of LED marquee light wires including a first set of LED marquee light wires and a second set of LED marquee light wires. The first set of LED marquee light wires is disposed in a same manner as that in the embodiment 1 and corresponds to one group of terminals of the DC output driver 14. The other group of terminals of the DC output driver 14 corresponds to the second set of LED marquee light wires. The wire cluster in the second set of LED marquee light wires are juxtaposed on the second set of audio wires. The second set of LED marquee light wires and the second set of audio wires are integrated as one wire cluster that is wrapped in transparent insulating layer 26.

The acousto-optic audio cable of this structure is suitable for an occasion where a long acousto-optic audio cable is required. The acousto-optic controller 20 is provided in a center part of the long acousto-optic audio cable, thereby enabling the acousto-optic audio cable to emit light uniformly.

On the basis of the embodiment 6, it will be apparent for those skilled in the art that two or more sets of LED marquee lights wires may be disposed on the second set of audio wires and the audio wire cluster, respectively. This modification or replacement falls within the scope of the claims and equivalent technical solutions of the present invention.

Embodiment 7

Figure 9:
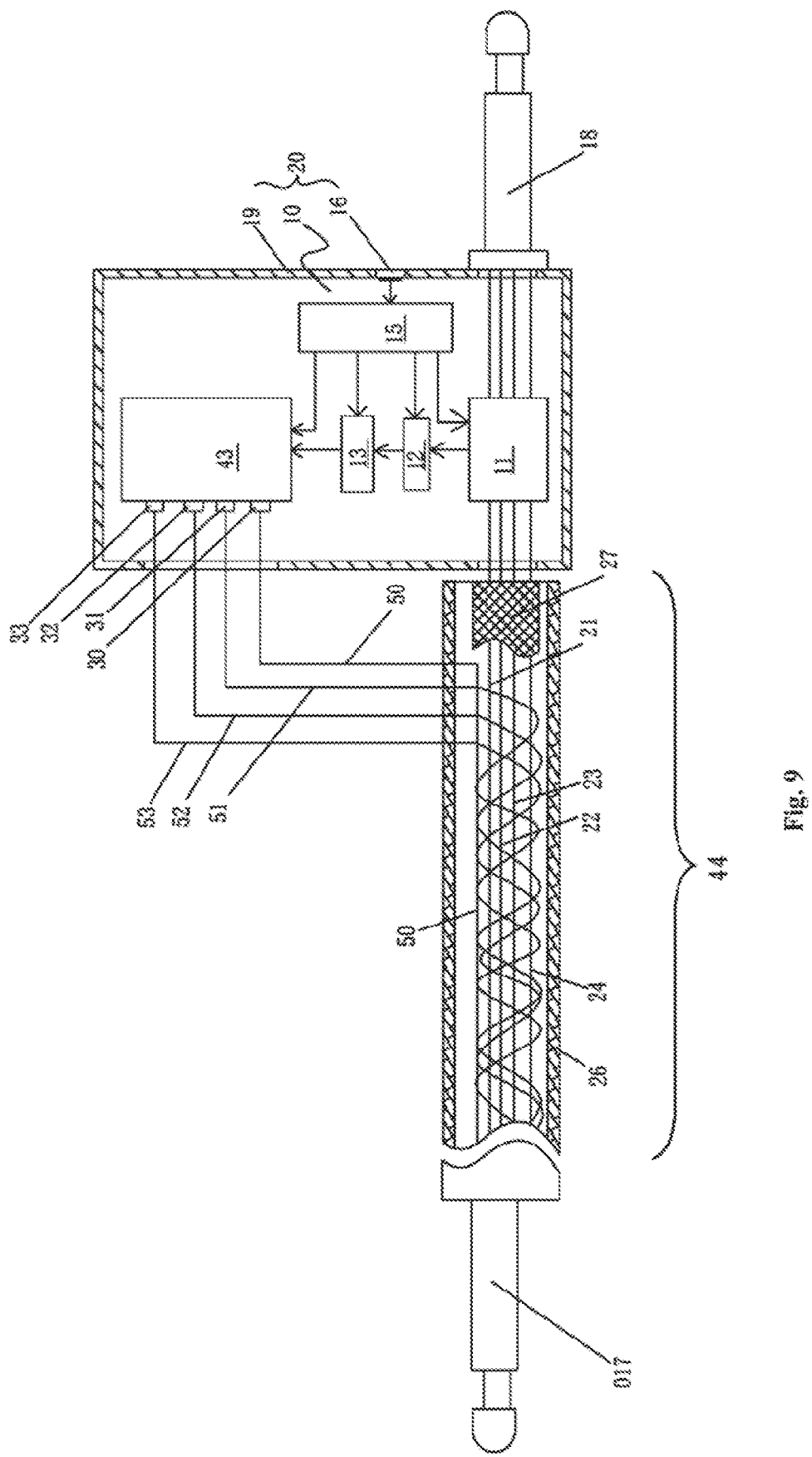
FIG. 9 shows a structural schematic diagram of embodiment 7.
Figure 10:
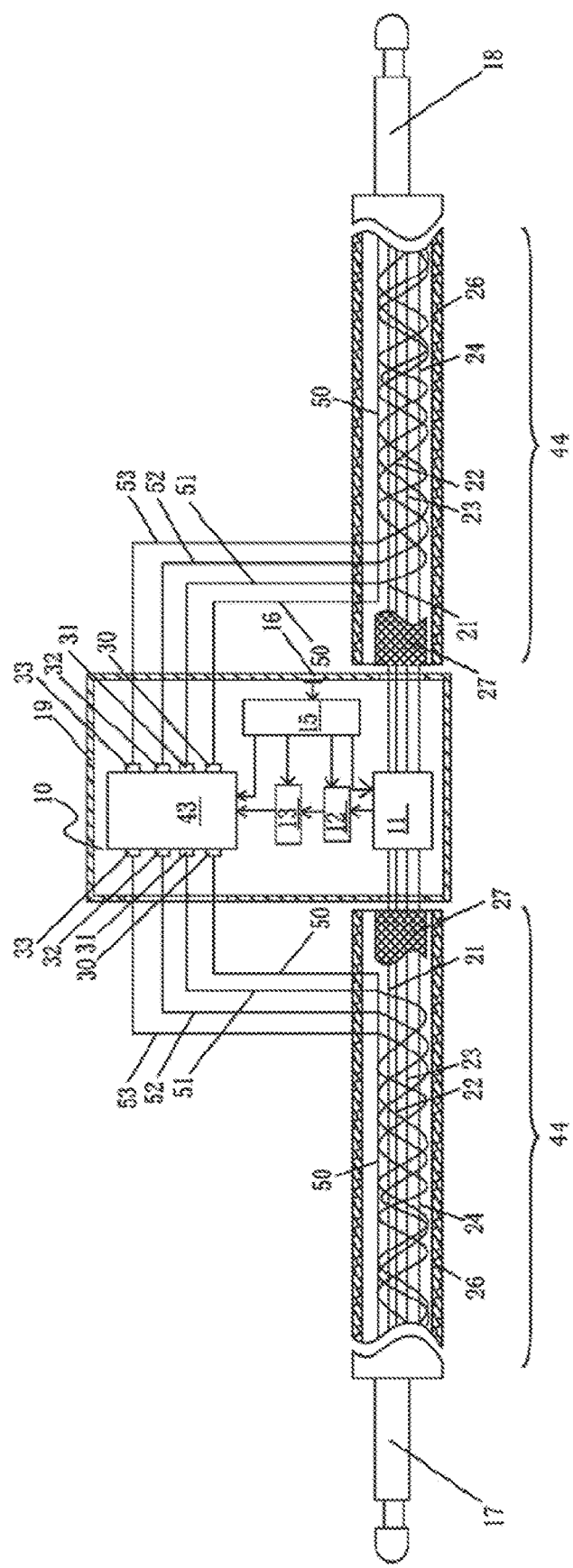
FIG. 10 shows another structural schematic diagram of embodiment 7.
Figure 11:
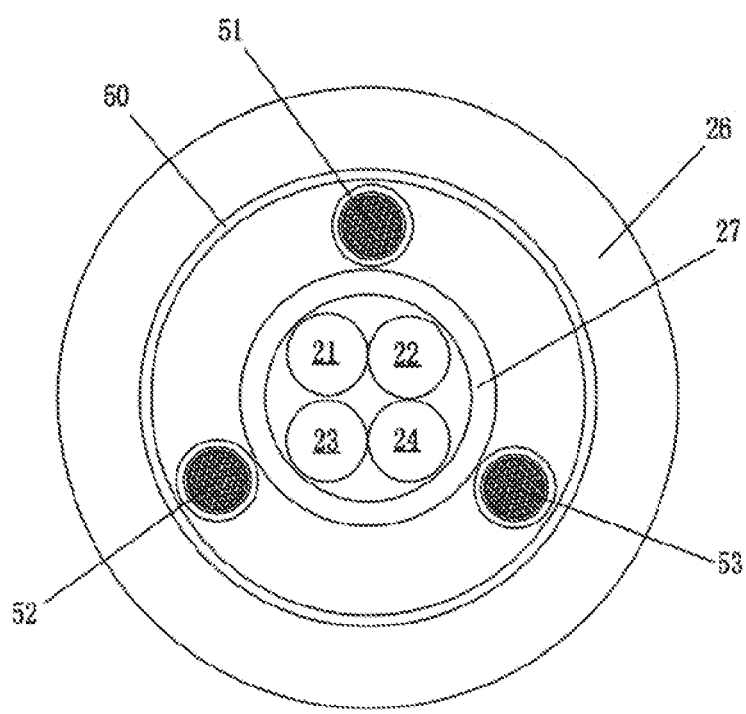
FIG. 11 a schematic diagram showing a cross-section of an audio wire cluster in embodiment 7.

Referring to FIG. 9, FIG. 10, and FIG. 11, an acousto-optic audio signal cable 44 includes an acousto-optic controller 20, an audio wire cluster, a set of light emitting cables, a first terminal 17, a second terminal 18 and a transparent insulating layer 26. The audio wire cluster includes a plurality of audio wires disposed in parallel. The light emitting cable is spirally wound around the audio wire cluster so that the wire cluster formed by audio wires are disposed at a central axis of the light emitting cable which is composed of at least three spirally twisted electroluminescent (EL) cables 51, 52 and 53. The transparent insulating layer 26 wraps the audio wire cluster and the light emitting cable. An input terminal of the acousto-optic controller 20 is coupled to one end of the audio wire cluster and one end of the light-emitting cable, respectively. An output end of the acousto-optic controller 20 is coupled to the second terminal 18. The other end of the audio wire cluster is coupled to the first terminal 17.

Specifically, the acousto-optic controller 20 includes a housing 19, a main circuit board 10 disposed in the housing 19, and a power supply/charging external socket 16 embedded in the housing 19. The main circuit board 10 includes a sampling amplifier circuit component 11, an analog-digital conversion circuit component 12, a microprocessor 13, a three-way alternating current (AC) output driver 43, and a power circuit component 15. An output terminal of the sampling amplifier circuit component 11 is coupled to an input terminal of the analog-digital conversion circuit component 12. An output terminal of the analog-digital conversion circuit component 12 is coupled to an input terminal of the microprocessor 13. An output terminal of the microprocessor 13 is connected with an input terminal of the AC output driver 43. The power circuit component 15 is electrically coupled to the sampling amplifier circuit component 11, the analog-to-digital conversion circuit component 12, the microprocessor 13 and the three-way AC output driver 43, respectively, to provide a stable power supply to the sampling amplifier circuit component 11, the analog-to-digital conversion circuit component 12, the microprocessor 13 and the three-way AC output driver 43. The power supply/charging external socket 16 is coupled between the power circuit component 15 and an external power supply, and provides power for the power circuit component 15 to charge the power circuit component 15. The three-way AC output driver 43 includes a common AC output terminal 30 and three AC output terminals 31, 32 and 33.

The audio wire cluster includes three signal conductors 21, 22, 23 and a ground conductor 24. Each of the signal conductors 21, 22, 23 is composed of a plurality of metal insulated conductors with low impedance and high conductivity. One end of each audio line is coupled to the first terminal 17, and the other end of each audio line is coupled to the input terminal of the sampling amplifier circuit component 11. The sampling amplifier circuit component 11 receives an electrical signal from the audio line. In addition, the output terminal of the sampling amplifier circuit component 11 is coupled to the second terminal 18 through a second set of audio wires. In the present embodiment, optionally, the second set of audio wires includes three sets of signal conductors 21, 22, 23 and a set of ground conductors 24. The second set of audio wires are coupled to the audio wires at the input terminal of the sampling amplifier circuit component 11 inside the sampling amplifier circuit component 11 in a one-to-one manner. A voice signal is transmitted by the second set of audio wires to an amplifier equipment through the second terminal 18.

The light emitting cables are spirally wound on an external wall of the audio wire cluster, respectively. Specifically, a set of light emitting cables includes at least three EL cables 51, 52, 53 and a common auxiliary electrode bare conductor 50. One end of each of the EL cables 51, 52, 53 is respectively coupled to each of the three AC output terminal 31, 32 and 33 of the three-way AC output drivers 43 in a one-to-one manner. One end of the common auxiliary electrode bare conductor 50 is coupled to the common AC output terminal 30 of the three-way AC output driver 43. The other end of each of the three EL cables 51, 52, and 53 and the other end of the common auxiliary electrode bare conductor 50 are in contact with each other and are jointly wound on the external wall of the audio wire cluster so that a wire cluster formed by audio wires are disposed at a central axis position of a light emitting cable which is composed of at least three spirally twisted EL cables 51, 52, and 53.

It should be noted that the EL cables 51, 52, and 53 can be formed in such a manner that an outer wall of a metal substrate conductor is coated with an insulating layer 25 of a high capacitance, and an outer wall of the insulating layer 25 is coated with a luminescent powder layer, an outer wall of the luminescent powder layer is coated with transparent conducting layer, and at least one metal bare conductor is disposed in parallel or spirally wound around the external wall of the transparent conductor layer, and is in contact with the transparent conducting layer. The metal substrate conductor of the light emitting cable and the common auxiliary electrode bare conductor 50 receive AC from a control module and then generates an AC electric field. A luminescent layer in the light emitting cables can emit light in the alternating electric field. The brightness and rhythm of the flashing light can be controlled by controlling frequency and voltage of the alternating electric field.

The audio wire cluster is wrapped in a metal woven mesh shield layer 27. The light emitting cable wraps an outside of the audio wire cluster. The transparent insulating layer 26 wraps an outside of a wire cluster of the audio wire cluster and the light emitting cable.

The transparent insulating layer 26 wraps an integrated wire cluster of the audio wire cluster and the LED marquee light wire.

When used, the first terminal 17 is coupled to a sound equipment and the second terminal 18 is coupled to an amplifier equipment. When the audio equipment makes sound, the sound transmitted by the audio wire is output through the amplifier equipment. Further, the sampling amplifier circuit component 11 samples an audio electrical signal from the audio wire and transmits it to the analog-digital conversion circuit signal 12. The audio electric signal is converted into a digital signal by analog-digital conversion circuit component 12. The digital signal is transmitted to the microprocessor 13 and then converted into a pulse signal. The pulse signal is output to the three-way alternating current output driver 43. The three-way alternating current output driver 43 controls each of the EL cables 51, 52, 53 to be sequentially electrified or to be extinguished, according to the received pulse signal command. The EL light emitting cable which is composed of at least three spirally twisted EL cables 51, 52 and 53 will produce regular flash of light or produce a chasing in sequence as running water effect. In the microprocessor 13, a specific conversion correspondence between the digital signals and pulse signals has been set in advance. Thus, a flash effect or a chasing in sequence as running water effect corresponding to each sound can be produced. In this way, the light effect produced by the acousto-optic audio signal cable corresponding to each sound in the audio can be characterized.

Embodiment 8

Figure 12:
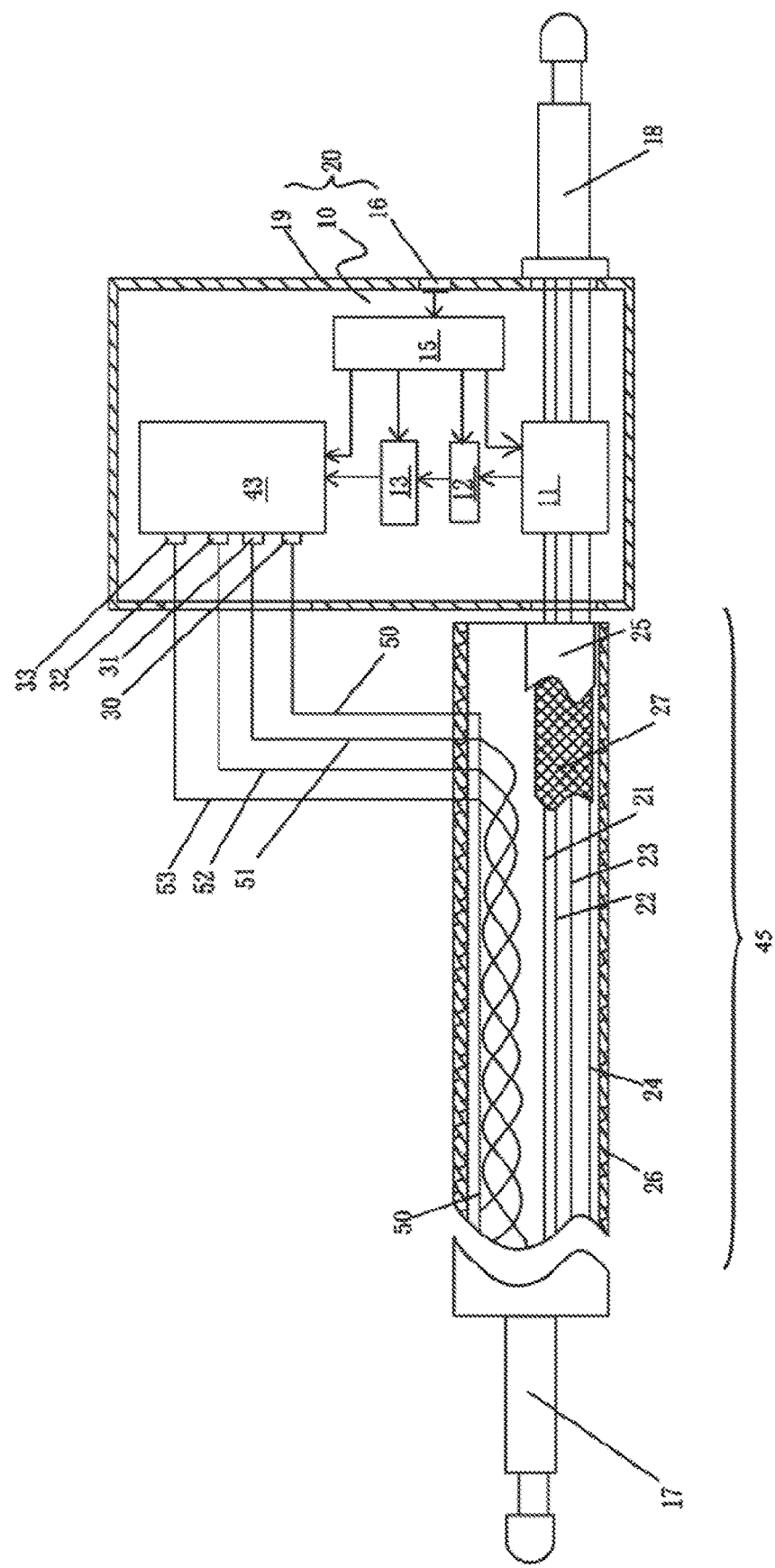
FIG. 12 shows a structural schematic diagram of embodiment 8.
Figure 13:
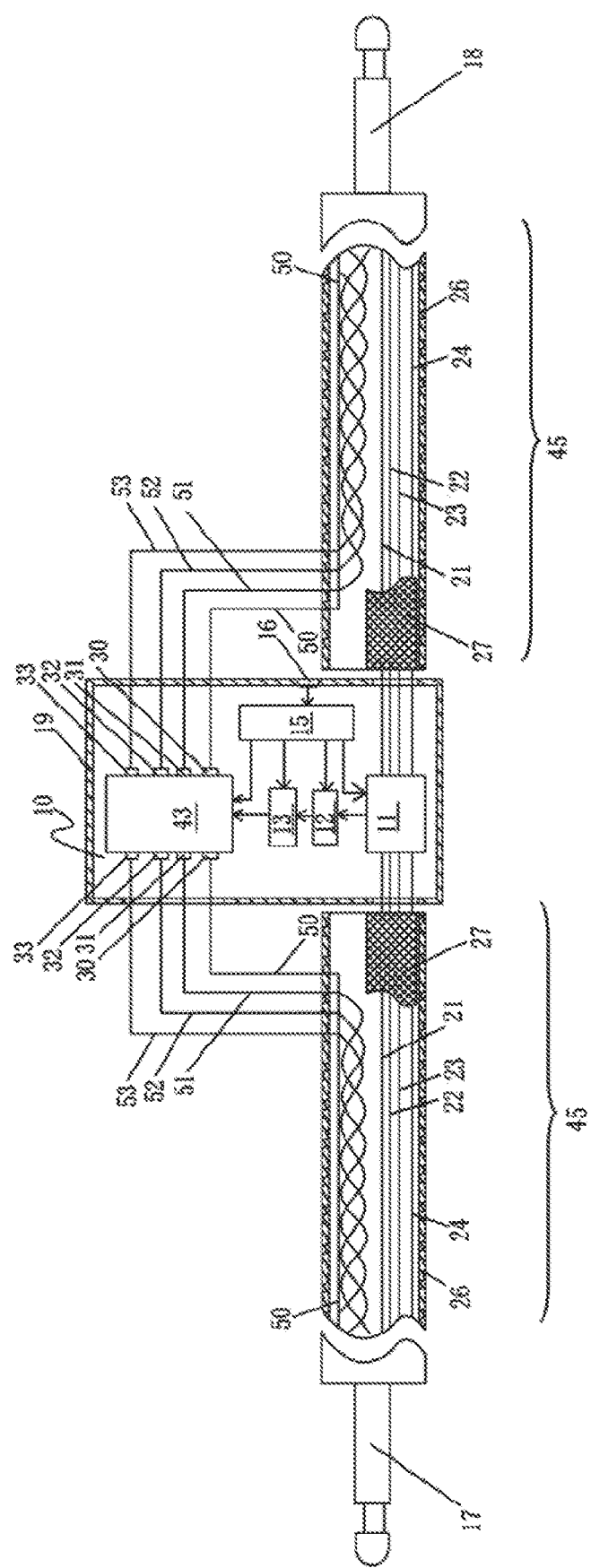
FIG. 13 shows another structural schematic diagram of embodiment 8.

As shown in FIG. 12 and FIG. 13, an acousto-optic audio signal cable 45 is similar to that in the embodiment 7. The differences lie in that the light emitting cable and the audio wire cluster in the embodiment 8 are disposed separately. The light emitting cables are not wound around the audio wire, and are disposed in parallel at one side of the audio wire cluster. The three EL light-emitting cables 51, 52 and 53 of the light emitting cable and one common auxiliary electrode bare conductor 50 are spirally wound with each other. As shown in FIG. 13, the second terminal can be coupled to an end of the acousto-optic audio signal cable 45.

Embodiment 9

Figure 14:
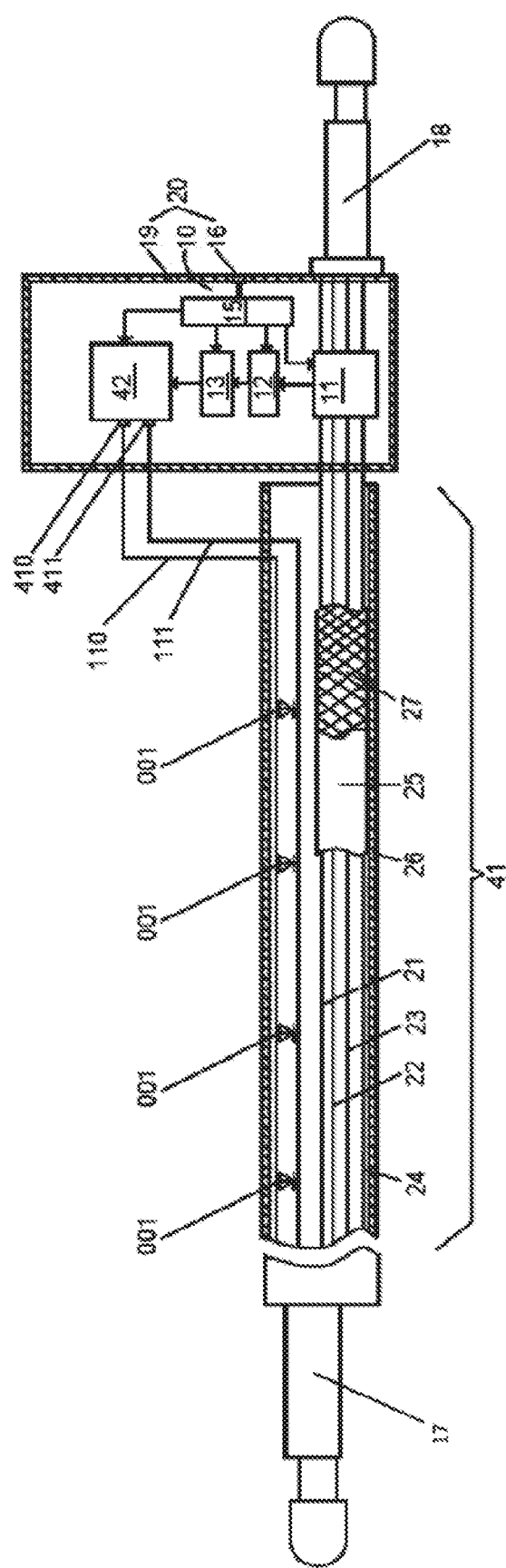
FIG. 14 shows a structural schematic diagram of embodiment 9.
Figure 15:
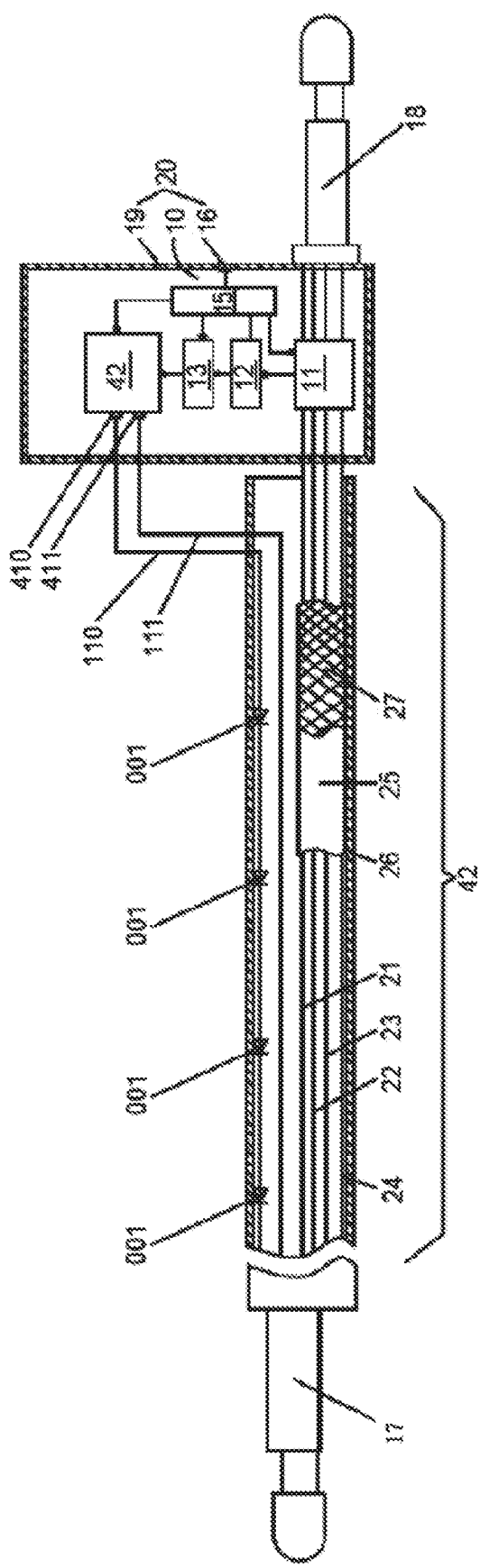
FIG. 15 shows another structural schematic diagram of embodiment 9.

As shown in FIG. 14 and FIG. 15, the acousto-optic audio signal cable 41 in the embodiment is similar to that of the embodiment 1. Constant bright or flickering LED light emitting string includes a plurality of surface-mounted LED lights 001 connected in parallel or in series between two copper conductors 110 and 111. The positive copper conductor 110 is coupled to the positive output terminal 410 of the output driver, and the negative copper conductor 111 is connected to the negative input terminal 411 of the output driver. The LED light emitting string has two kinds of structures: in series and in parallel. The LED lights are fillet-weld between the positive copper conductor 110 and the negative copper conductor 111 at a preset interval along a preset direction, and form an LED light emitting string in which the LED lights are connected in parallel. The other structure is shown in FIG. 15, the positive copper conductor is divided into several sections, and a group of LED lights are welded at two ends of each of the sections with the LED lights connected in series, negative electrodes of the last LED lights of various groups are connected in parallel and are coupled to the negative copper conductor, thereby forming an LED light emitting string in which the LED lights are connected in series. The LED light emitting string in which the LED lights are connected in series can be driven by an alternative frequency current and several LED light emitting strings in which the LED lights are connected in series may be connected in series to form a long-string acousto-optic audio signal cable.

The LED light emitting strings are juxtaposed at one side of the audio wire cluster. A transparent or light-emitting plastic 28 wraps an external wall of acousto-optic audio cable which is composed of the LED light emitting strings and the audio wires and which has a circular, flat or oval cross-section.

The acousto-optic audio cable can only produce a light in flash effect, and cannot produce a chasing in sequence as running water effect. However when the acousto-optic audio cable produces a light in flash effect, the acousto-optic audio cable can be controlled by the acousto-optic controller 20 to light in flash in time to music, and the luminance of the light in flash can be varied as the rhythm various of music, produce a strong dynamic property.

Connections among the audio wire cluster composed of the LED light emitting strings, a sound source equipment and an amplifying equipment are the same as those in the embodiments 1, 2, 3, 4, 5, 6, and 7. The connections among the audio wire cluster, the sound source equipment and the amplifying equipment may be implemented via the first and second terminals, or may be implemented by means of direct connection without terminals.

Embodiment 10

Figure 16:
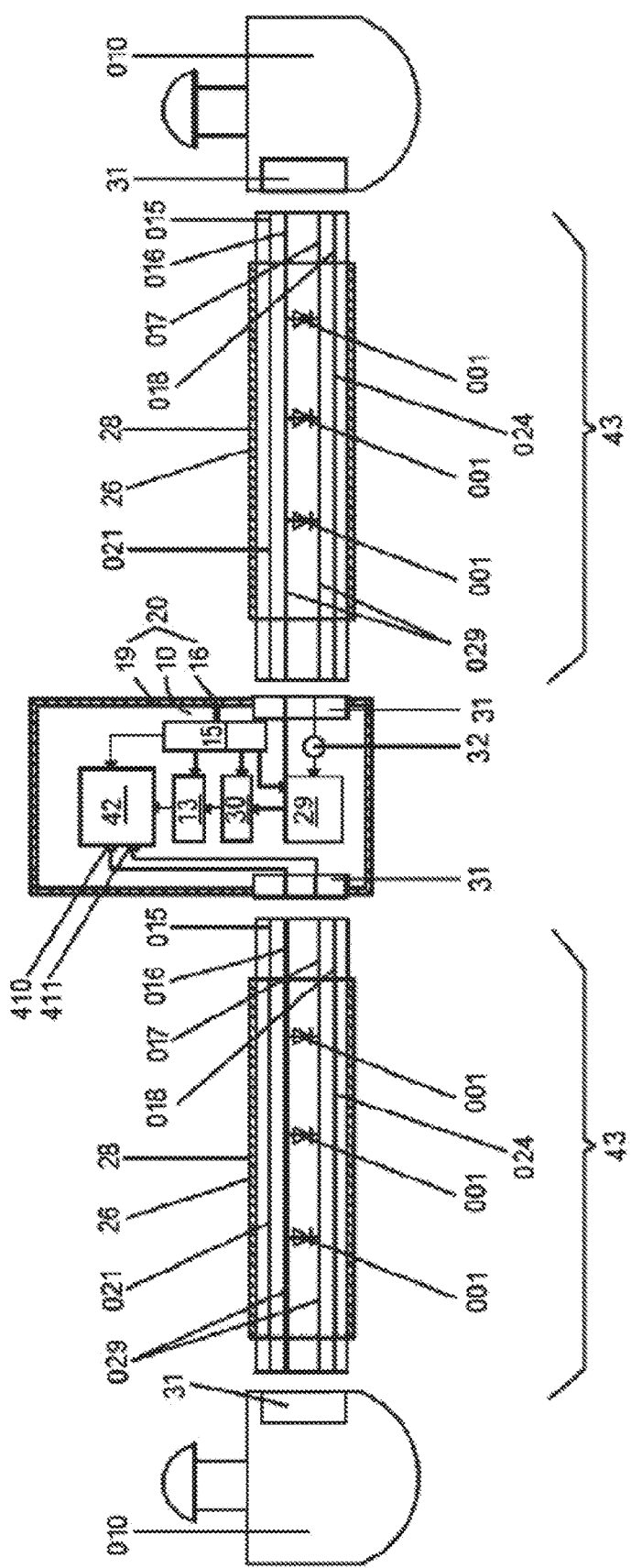
FIG. 16 shows a structural schematic diagram of embodiment 10.

As shown in FIG. 16, an acousto-optic audio signal cable includes a plurality of surface-mounted LED lights 001, a printed signal conductor circuit 021, a printed signal ground conductor 024, and an FPC board 28. The audio signal conductor 021, the printed signal ground conductor 024 and a positive electrode circuit 210 of the LED light emitting string and a negative electrode circuit 211 of the LED light emitting string are fabricated on the FPC board 28 in the form of printed circuits without any audio signal cable cluster separately provided. A plurality of FPC terminal plug-connected conductive strips 015, 016, 017 and 018 is disposed on an end of the FPC board which has a shape of a strip. The FPC terminal plug-connected conductive strips 015, 016, 017 and 018 are parallel to each other. The FPC terminal plug-connected conductive strips 015, 016, 017 and 018 are coupled to the printed signal conductor circuit 021, the printed signal ground conductor 024, the positive electrode circuit 210 of the LED light emitting string and the negative electrode circuit 211 of the LED light emitting string, respectively. The FPC terminal plug-connected conductive strips can be used as a connector lug of the acousto-optic audio signal cable, and then can be directly inserted into an FPC terminal socket 31 of the main circuit board or an earphone. The main circuit board 10 is enabled to receive audio signals from the earphone 010, and the main circuit board 10 is enabled to be coupled to the LED light emitting string 029, thereby driving the LED light emitting string 029 to light in flash according to according to tone and rhythm of a music.

The main circuit board 10 of the acousto-optic controller is provided with a bluetooth wireless transceiver circuit component 29 which is to receive and process wireless digital and analog signals, and transmit the digital signal of a mobile phone to the microprocessor 13 on the main circuit board. Then, the signal is further transmitted synchronously to the output driver 42, thereby enabling the output driver 42 to control a number of LED lamps 001 to produce light of which brightness and rhythm can be varied as the rhythm of the music and voice levels. At the same time, the digital signal is converted into an analog signal to drive the earphone 010 to make sound. The bluetooth wireless transceiver circuit component 29 may also convert an analog signal of a voice from a microphone 32 into a digital signal and transmit it wirelessly to the mobile phone.

In the acousto-optic audio cable, the FPC terminal plug-connective conductive strips 015, 016, 017,018 are plugged in the FPC terminal socket 31 without welding. The acousto-optic audio signal cable and LED light emitting cable can directly connect a main circuit board to the earphone. An external wall of the acousto-optic audio signal cable is wrapped in a transparent and light-transmitting insulation layer.

On the basis of the present embodiment 10, it will be apparent to those skilled in the art that LED marquee light wire may be composed of three or more sets of LED light emitting strings on the audio wire cluster. This modifications and variations falls within the claims of the present invention and within the protection scope of an equivalent technical solution.

Embodiment 11

Figure 17:
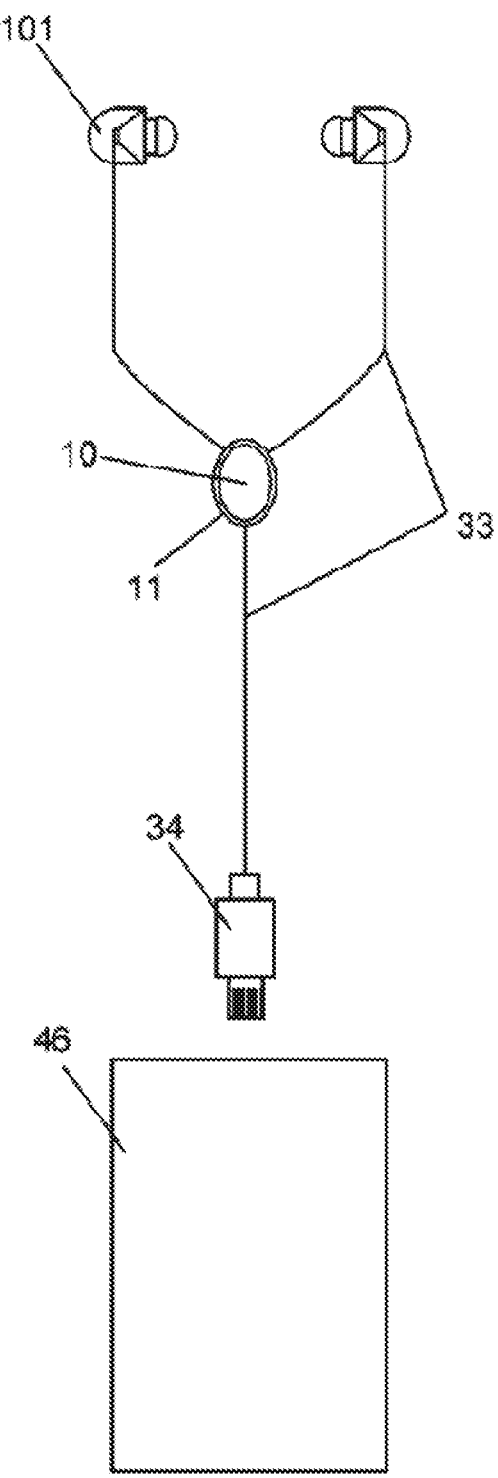
FIG. 17 shows a structural schematic diagram of embodiment 11.
Figure 18:
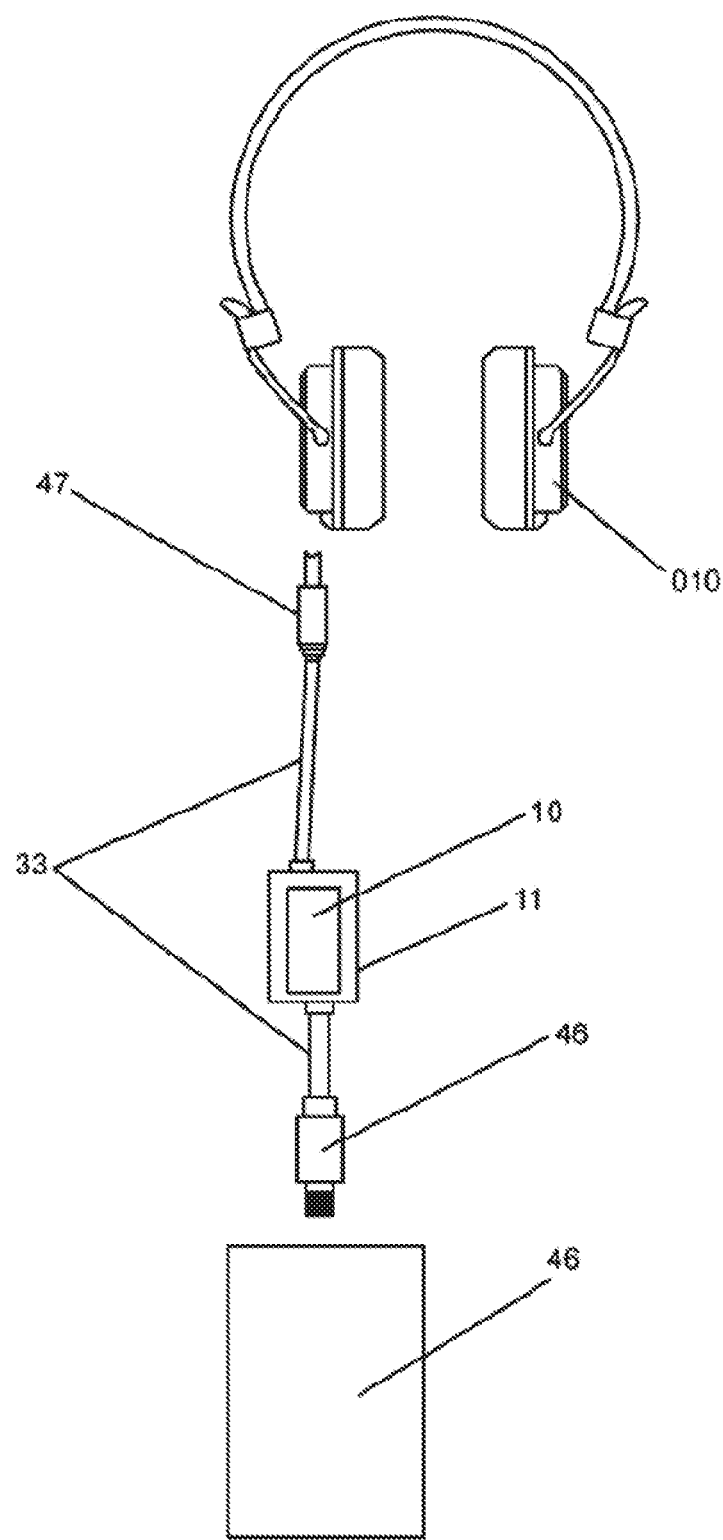
FIG. 18 shows another structural schematic diagram of embodiment 11.

As shown in FIG. 17 and FIG. 18, one end of an earphone acousto-optic audio signal cable 33 is coupled to an earphone 010 and the other end thereof is coupled to a mobile phone 46 through a lightning plug 34, a Type-C plug 35 or a micro USB plug. The plug may be coupled to a mobile phone battery, thereby enabling a mobile phone power to be directly connected with the power circuit component 15 in the main circuit board 10 of the acousto-optic audio signal cable by a ground wire and a signal power wire. Thus, a battery case battery circuit and a storage battery of the power circuit component 15 may be eliminated. Also, the power supply/charging external socket may also be eliminated. Therefore, the main circuit board 10 and the housing 19 are reduced in size and an appearance is more beautiful.

It should be noted that, a printed circuit board (PCB), also known as a printed wiring board, is an important electronic component, and is a supporter for electronic components and is a carrier of electrical connections. Since it is fabricated using the electronic printing technology, it is called "printed" circuit board.

The LED marquee light wire, the light emitting cable and a single piece of the EL light emitting cables 51, 52, and 53 are all specific products of the light emitting cable. These cables receive a signal from the acousto-optic controller 20, and then light in flash under control.

The DC output driver 14 and the three-way alternating current output driver 43 are both specific products of the output driver. The output driver controls the light emitting cable to light in flash in accordance with a signal received from the microprocessor 13.

In addition to being applied in the present invention, several groups of the LED light emitting strings each including one pair of positive and negative copper conductors as well as surface-mounted LED lights can also be widely applied in LED holiday light strings and various kinds of light strings such as advertisements and decorations. The claims of the present disclosure protect an application of the fields mentioned above.

The present disclosure is not limited to the embodiments described above. Any changes or improvement made by people having ordinary skill in the art within spirit of the present disclosure shall be included in the protection scope of the present disclosure.

What is claimed is:

1. An acousto-optic audio signal cable, comprising:
   an audio wire cluster;
   an acousto-optic controller;
   at least one Light Emitting Diode (LED) marquee light wire or at least one LED light emitting string, the at least one LED marquee light wire or the at least one LED light emitting string being parallel arranged at an outside of the at least one audio wire cluster or the at least one LED marquee light wire or the at least one LED light emitting string being wound in a spiral on an external wall of the audio wire cluster, thereby forming one cluster; and
   a transparent or light-transmitting insulating layer wrapping the one cluster;
   wherein the acousto-optic controller comprises a main circuit board, and the main circuit board comprises a sampling amplifier circuit component, an analog-digital conversion circuit component, a microprocessor and an output driver that are sequentially coupled to each other;
   wherein the audio wire cluster is coupled to the sampling amplifier circuit component; the at least one LED marquee light wire or the at least one LED light emitting string is coupled to the output driver;
   wherein the main circuit board further comprises a power circuit component, an input terminal of the power circuit component is coupled to a power supply/charging external socket; and
   wherein an output terminal of the power circuit component is coupled to the sampling amplifier circuit component, the analog-digital conversion circuit component, the microprocessor and the output driver, respectively, or the output terminal of the power circuit component is coupled to a bluetooth wireless transceiver circuit component, a digital-analog and analog-digital bidirectional conversion circuit component, the microprocessor and the output driver, respectively.

2. The acousto-optic audio signal cable according to claim 1, wherein the at least one LED marquee light wire or the at least one LED light emitting string is composed of surface-mounted LED lights welded in parallel or in series on a copper conductor or a Flexible Printed Circuit (FPC) board.

3. The acousto-optic audio signal cable according to claim 1, wherein the LED light emitting string comprises surface-mounted LED lights;

wherein the audio wire cluster comprises a positive copper conductor and a negative copper conductor;

wherein the positive copper conductor and the negative copper conductor are coupled to a positive output terminal and a negative input terminal of the output driver, respectively; and other ends of the positive copper conductor and the negative copper conductor extend along the audio wire cluster;

wherein the positive copper conductor and the negative copper conductor form a conduction loop with a group of LED light emitting strings that are coupled in parallel or in series;

wherein in the conduction loop with the LED light emitting strings that are coupled in series, the positive copper conductor is divided into a plurality of sections, groups of surface-mounted LED lights are welded in series on two ends of each of the sections of the copper conductor; and negative poles of last surface-mounted LED lights of the groups are coupled to the negative copper conductor in parallel with each other, thereby connecting the surface-mounted LED lights to a negative input end of the output driver.

4. The acousto-optic audio signal cable according to claim 1, wherein the acousto-optic controller is disposed in the acousto-optic audio signal cable or at one end of the acousto-optic audio signal cable;

wherein the audio wire cluster in the acousto-optic audio cable is coupled to an audio equipment and an amplifier equipment directly or by means of a first connector and a second connector; and wherein an insulation layer, a metal woven mesh shield layer or an aluminum foil shielding layer is disposed between the audio wire cluster and one of the LED marquee light wire, the LED light emitting string or a light emitting cable of the acousto-optic audio cable.

5. The acousto-optic audio signal cable according to claim 1, wherein the acousto-optic controller further comprises a housing and the power supply/charging external socket embedded in the housing; and the main circuit board is in the housing.

6. The acousto-optic audio signal cable according to claim 1, wherein the LED marquee light wire is composed of at least three sets of LED light emitting strings arranged in parallel or wound in a spiral around the external wall of the audio wire cluster at a certain twist distance.

7. An earphone acousto-optic audio signal cable, comprising:
an audio wire cluster;
an acousto-optic controller;
at least one Light Emitting Diode (LED) marquee light wire or at least one LED light emitting string, the at least one LED marquee light wire or the at least one LED light emitting string being parallel arranged at an outside of the at least one audio wire cluster or the at least one LED marquee light wire or the at least one LED light emitting string being wound in a spiral on an external wall of the audio wire cluster, thereby forming one cluster; and
a transparent or light-transmitting insulating layer wrapping the one cluster;
wherein the acousto-optic controller comprises a main circuit board, and the main circuit board comprises a sampling amplifier circuit component, an analog-digital conversion circuit component, a microprocessor and an output driver that are sequentially coupled to each other;

wherein the audio wire cluster is coupled to the sampling amplifier circuit component; the at least one LED marquee light wire or the at least one LED light emitting string is coupled to the output driver;

wherein the audio wire cluster in the acousto-optic audio cable is coupled to an audio equipment and an amplifier equipment by means of a first connector and a second connector; the first connector or the second connector is a lightning plug, a type-C plug or a micro USB plug;

wherein the lightning plug, the type-C plug or the micro USB plug is coupled to a mobile phone battery, so that a mobile phone power supply is directly connected to a power supply circuit component of the main circuit board through a power line of the audio wire cluster.

8. The earphone acousto-optic audio signal cable according to claim 7, wherein the LED light emitting string comprises surface-mounted LED lights;

wherein the audio wire cluster comprises a positive copper conductor and a negative copper conductor;

wherein the positive copper conductor and the negative copper conductor are coupled to a positive output terminal and a negative input terminal of the output driver, respectively; and other ends of the positive copper conductor and the negative copper conductor extend along the audio wire cluster;

wherein the positive copper conductor and the negative copper conductor form a conduction loop with a group of LED light emitting strings that are coupled in parallel or in series;

wherein in the conduction loop with the LED light emitting strings that are coupled in series, the positive copper conductor is divided into a plurality of sections, groups of surface-mounted LED lights are welded in series on two ends of each of the sections of the copper conductor; and negative poles of last surface-mounted LED lights of the groups are coupled to the negative copper conductor in parallel with each other, thereby connecting the surface-mounted LED lights to a negative input end of the output driver.

9. The earphone acousto-optic audio signal cable according to claim 7, wherein the acousto-optic controller is disposed in the earphone acousto-optic audio signal cable or at one end of the earphone acousto-optic audio signal cable;

wherein an insulation layer, a metal woven mesh shield layer or an aluminum foil shielding layer is disposed between the audio wire cluster and one of the LED marquee light wire, the LED light emitting string or a light emitting cable of the acousto-optic audio cable.

10. The earphone acousto-optic audio signal cable according to claim 7, wherein the LED marquee light wire is composed of at least three sets of LED light emitting strings arranged in parallel or wound in a spiral around the external wall of the audio wire cluster at a certain twist distance.

11. The earphone acousto-optic audio signal cable according to claim 7, wherein each of the LED marquee light wire and the LED light emitting string is composed of surface-mounted LED lights welded in parallel or in series on a copper conductor or a flexible printed circuit (FPC) board; and the LED marquee light wire or the LED light emitting string is coupled to an output terminal of the output driver.

12. An acousto-optic audio signal cable, comprising:
an audio wire cluster;
at least one electroluminescent (EL) cable; and
an acousto-optic controller;
wherein the audio wire cluster is disposed in parallel with the at least one EL cable or is disposed at a central axis of the EL cable, thereby forming one cluster, and the one cluster is wrapped in a transparent or light-transmitting insulation layer;

wherein the acousto-optic controller comprises a main circuit board, and the main circuit board comprises a sampling amplifier circuit component, an analog-digital conversion circuit component, a microprocessor and an output driver that are sequentially coupled to each other;

wherein the audio wire cluster is coupled to the sampling amplifier circuit component; the at least one EL cable is coupled to the output driver;

wherein the main circuit board further comprises a power circuit component, an input terminal of the power circuit component is coupled to a power supply/charging external socket; and wherein an output terminal of the power circuit component is coupled to the sampling amplifier circuit component, the analog-digital conversion circuit component, the microprocessor and the output driver, respectively, or the output terminal of the power circuit component is coupled to a bluetooth wireless transceiver circuit component, a digital-analog and analog-digital bidirectional conversion circuit component, the microprocessor and the output driver, respectively.

13. The acousto-optic signal line according to claim 12, wherein the acousto-optic controller is disposed in the acousto-optic audio signal cable or at one end of the acousto-optic audio signal cable;

wherein the audio wire cluster in the acousto-optic audio cable is coupled to an audio equipment and an amplifier equipment by means of a first connector and a second connector; and wherein an insulation layer, a metal woven mesh shield layer or an aluminum foil shielding layer is disposed between the audio wire cluster and one of a light emitting diode (LED) marquee light wire, an LED light emitting string or a light emitting cable of the acousto-optic audio cable.

14. The acousto-optic signal line according to claim 12, wherein the acousto-optic controller further comprises a housing and the power supply/charging external socket embedded in the housing; the main circuit board is in the housing;

wherein the main circuit board further comprises a power circuit component; an input terminal of the power circuit component is coupled to the power supply/charging external socket; and wherein an output terminal of the power circuit component is coupled to the sampling amplifier circuit component, the analog-digital conversion circuit component, the microprocessor and the output driver, respectively, or the output terminal of the power circuit component is coupled to a bluetooth wireless transceiver circuit component, a digital-analog and analog-digital bidirectional conversion circuit component, the microprocessor and the output driver, respectively.

\* \* \* \* \*